(12) United States Patent
Tiedemann, Jr. et al.

(10) Patent No.: US 8,489,949 B2
(45) Date of Patent: Jul. 16, 2013

(54) COMBINING GRANT, ACKNOWLEDGEMENT, AND RATE CONTROL COMMANDS

(75) Inventors: Edward G. Tiedemann, Jr., Concord, MA (US); Aleksandar Damnjanovic, San Diego, CA (US); Avinash Jain, San Diego, CA (US); Durga P. Malladi, San Diego, CA (US); David Puig Oses, San Diego, CA (US); Peter Gaal, San Diego, CA (US); Stein Lundby, Solana Beach, CA (US); Sandip Sarkar, San Diego, CA (US); Tao Chen, La Jolla, CA (US); Yongbin Wei, San Diego, CA (US); Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 10/780,824

(22) Filed: Feb. 17, 2004

(65) Prior Publication Data

US 2005/0030911 A1 Feb. 10, 2005

Related U.S. Application Data

(60) Provisional application No. 60/493,046, filed on Aug. 5, 2003, provisional application No. 60/496,297, filed on Aug. 18, 2003.

(51) Int. Cl.
*G08C 25/02* (2006.01)
(52) U.S. Cl.
USPC ............ 714/748; 370/331; 370/443; 370/468
(58) Field of Classification Search
USPC ........................ 370/331, 443, 468; 714/748
See application file for complete search history.

(56) References Cited

U.S. PATENT DOCUMENTS

| 2,149,518 A | 3/1939 | Thomas, Sr. |
| 3,470,324 A | 9/1969 | Harmuth |

(Continued)

FOREIGN PATENT DOCUMENTS

| CN | 1166094 | 11/1997 |
| CN | 1263675 | 8/2000 |

(Continued)

OTHER PUBLICATIONS

Written Opinion—PCT/US04/025375, International Search Authority—European Patent Office, Dec. 22, 2004.

(Continued)

*Primary Examiner* — Sam Rizk
(74) *Attorney, Agent, or Firm* — Donald C. Kordich

(57) ABSTRACT

Embodiments disclosed herein address the need in the art for reduced overhead control with the ability to adjust transmission rates as necessary. In one aspect, a first signal indicates an acknowledgement of a decoded subpacket and whether or not a rate control command is generated, and a second signal conditionally indicates the rate control command when one is generated. In another aspect, a grant may be generated concurrently with the acknowledgement. In yet another aspect, a mobile station monitors the first signal, conditionally monitors the second signal as indicated by the first signal, and may monitor a third signal comprising a grant. In yet another aspect, one or more base stations transmit one or more of the various signals. Various other aspects are also presented. These aspects have the benefit of providing the flexibility of grant-based control while utilizing lower overhead when rate control commands are used, thus increasing system utilization, increasing capacity and throughput.

63 Claims, 11 Drawing Sheets

U.S. PATENT DOCUMENTS

| | | |
|---|---|---|
| 4,768,023 A | 8/1988 | Xie |
| 5,280,472 A | 1/1994 | Gilhousen et al. |
| 5,394,433 A | 2/1995 | Bantz |
| 5,406,585 A | 4/1995 | Rohani et al. |
| 5,463,342 A | 10/1995 | Guard |
| 5,483,557 A | 1/1996 | Webb |
| 5,490,165 A | 2/1996 | Blakeney, II et al. |
| 5,535,214 A | 7/1996 | Shiobara |
| 5,544,156 A | 8/1996 | Teder et al. |
| 5,553,062 A | 9/1996 | Schilling et al. |
| 5,581,575 A | 12/1996 | Zehavi et al. |
| 5,592,470 A | 1/1997 | Rudrapatna et al. |
| 5,627,938 A | 5/1997 | Johnston |
| 5,647,366 A | 7/1997 | Weng |
| 5,712,869 A | 1/1998 | Lee et al. |
| 5,719,852 A | 2/1998 | Schilling et al. |
| 5,726,978 A | 3/1998 | Frodigh et al. |
| 5,732,391 A | 3/1998 | Fiocca |
| 5,745,480 A | 4/1998 | Behtash et al. |
| 5,752,193 A | 5/1998 | Scholefield et al. |
| 5,754,537 A | 5/1998 | Jamal |
| 5,764,551 A | 6/1998 | McCorkle |
| 5,774,809 A | 6/1998 | Tuutijarvi et al. |
| 5,781,861 A | 7/1998 | Kang et al. |
| 5,809,059 A | 9/1998 | Souissi et al. |
| 5,815,526 A | 9/1998 | Rice |
| 5,857,174 A | 1/1999 | Dugan |
| 5,862,451 A | 1/1999 | Grau et al. |
| 5,864,760 A | 1/1999 | Gilhousen et al. |
| 5,875,214 A | 2/1999 | Urbaniak et al. |
| 5,903,608 A | 5/1999 | Chun |
| 5,914,950 A | 6/1999 | Tiedemann, Jr. et al. |
| 5,920,705 A | 7/1999 | Lyon et al. |
| 5,923,650 A | 7/1999 | Chen et al. |
| 5,938,749 A | 8/1999 | Rusu et al. |
| 5,956,642 A | 9/1999 | Larsson et al. |
| 5,966,377 A | 10/1999 | Murai |
| 5,966,670 A | 10/1999 | Keskitalo et al. |
| 5,969,751 A | 10/1999 | Lee |
| 5,973,642 A | 10/1999 | Li et al. |
| 5,991,271 A | 11/1999 | Jones et al. |
| 5,991,273 A | 11/1999 | Abu-Dayya |
| 6,005,876 A | 12/1999 | Cimini, Jr. et al. |
| 6,014,373 A | 1/2000 | Schilling et al. |
| 6,046,980 A | 4/2000 | Packer et al. |
| 6,049,716 A | 4/2000 | Jung |
| 6,052,594 A | 4/2000 | Chuang et al. |
| 6,061,359 A | 5/2000 | Schilling et al. |
| 6,064,692 A | 5/2000 | Chow |
| 6,085,091 A | 7/2000 | Yoo et al. |
| 6,088,387 A | 7/2000 | Gelblum et al. |
| 6,094,459 A | 7/2000 | Kao et al. |
| 6,101,168 A | 8/2000 | Chen et al. |
| 6,108,374 A | 8/2000 | Balachandran et al. |
| 6,108,384 A | 8/2000 | Okumura et al. |
| 6,111,911 A | 8/2000 | Sanderford, Jr. et al. |
| 6,115,357 A * | 9/2000 | Packer et al. ............... 370/231 |
| 6,128,283 A | 10/2000 | Sabaa et al. |
| 6,128,349 A | 10/2000 | Chow |
| 6,128,882 A | 10/2000 | Jones |
| 6,130,882 A | 10/2000 | Levin |
| 6,131,016 A | 10/2000 | Greenstein et al. |
| 6,134,215 A | 10/2000 | Agrawal et al. |
| 6,134,218 A | 10/2000 | Holden |
| 6,141,388 A | 10/2000 | Servais et al. |
| 6,144,654 A | 11/2000 | Ibanez-Meier et al. |
| 6,151,696 A | 11/2000 | Miller et al. |
| 6,195,552 B1 | 2/2001 | Jeong et al. |
| 6,201,576 B1 | 3/2001 | Raghunath et al. |
| 6,201,954 B1 | 3/2001 | Soliman |
| 6,205,129 B1 | 3/2001 | Esteves et al. |
| 6,208,699 B1 | 3/2001 | Chen et al. |
| 6,208,858 B1 | 3/2001 | Antonio et al. |
| 6,219,374 B1 | 4/2001 | Kim et al. |
| 6,222,875 B1 | 4/2001 | Dahlman et al. |
| 6,222,888 B1 | 4/2001 | Kao et al. |
| 6,230,203 B1 | 5/2001 | Koperda et al. |
| 6,233,455 B1 | 5/2001 | Ramakrishna et al. |
| 6,259,746 B1 | 7/2001 | Levin et al. |
| 6,292,515 B1 | 9/2001 | Kao et al. |
| 6,298,041 B1 | 10/2001 | Packer |
| 6,307,844 B1 | 10/2001 | Tsunehara et al. |
| 6,335,922 B1 | 1/2002 | Tiedemann, Jr. et al. |
| 6,347,080 B2 | 2/2002 | Jou et al. |
| 6,363,255 B1 * | 3/2002 | Kuwahara ............... 455/456.5 |
| 6,389,056 B1 | 5/2002 | Kanterakis et al. |
| 6,414,988 B1 | 7/2002 | Ling |
| 6,425,105 B1 | 7/2002 | Piirainen et al. |
| 6,426,960 B2 | 7/2002 | Antonio |
| 6,442,130 B1 | 8/2002 | Jones, IV et al. |
| 6,456,653 B1 | 9/2002 | Sayeed |
| 6,483,816 B2 | 11/2002 | Tsunehara et al. |
| 6,490,461 B1 | 12/2002 | Muller |
| 6,496,496 B1 | 12/2002 | Ramakrishna et al. |
| 6,505,058 B1 | 1/2003 | Willey |
| 6,507,585 B1 | 1/2003 | Dobson |
| 6,512,925 B1 | 1/2003 | Chen et al. |
| 6,532,363 B1 | 3/2003 | Pussinen |
| 6,535,723 B1 | 3/2003 | Jiang et al. |
| 6,549,561 B2 | 4/2003 | Crawford |
| 6,563,885 B1 | 5/2003 | Magee et al. |
| 6,570,444 B2 | 5/2003 | Wright |
| 6,571,101 B1 | 5/2003 | Schulz |
| 6,571,104 B1 | 5/2003 | Nanda et al. |
| 6,574,205 B1 | 6/2003 | Sato |
| 6,590,879 B1 | 7/2003 | Huang et al. |
| 6,597,913 B2 | 7/2003 | Natarajan |
| 6,609,007 B1 | 8/2003 | Eibling et al. |
| 6,654,609 B2 | 11/2003 | Kim |
| 6,680,925 B2 * | 1/2004 | Wu et al. ............... 370/329 |
| 6,693,892 B1 | 2/2004 | Rinne et al. |
| 6,694,469 B1 | 2/2004 | Jalali et al. |
| 6,701,151 B2 | 3/2004 | Diachina et al. |
| 6,711,208 B2 | 3/2004 | Razoumov et al. |
| 6,741,862 B2 * | 5/2004 | Chung et al. ............... 455/452.1 |
| 6,744,754 B1 | 6/2004 | Lee |
| 6,751,264 B2 | 6/2004 | Ho et al. |
| 6,751,444 B1 | 6/2004 | Meiyappan |
| 6,757,241 B1 | 6/2004 | Jones et al. |
| 6,760,303 B1 | 7/2004 | Brouwer |
| 6,775,544 B2 | 8/2004 | Ficarra |
| RE38,603 E | 9/2004 | Kim et al. |
| 6,816,827 B1 | 11/2004 | Xia et al. |
| 6,836,666 B2 | 12/2004 | Gopalakrishnan et al. |
| 6,847,826 B1 | 1/2005 | Wesby et al. |
| 6,847,828 B2 | 1/2005 | Miyoshi et al. |
| 6,865,389 B2 | 3/2005 | Lee et al. |
| 6,876,641 B2 | 4/2005 | Banister |
| 6,880,103 B2 | 4/2005 | Kim et al. |
| 6,898,418 B2 | 5/2005 | Rauschmayer |
| 6,904,286 B1 * | 6/2005 | Dantu ............... 455/452.2 |
| 6,917,581 B2 | 7/2005 | Proctor, Jr. et al. |
| 6,937,582 B1 | 8/2005 | Kronestedt |
| 6,952,561 B1 | 10/2005 | Kumar et al. |
| 6,982,946 B2 | 1/2006 | Wiberg et al. |
| 6,987,798 B2 | 1/2006 | Ahn et al. |
| 6,996,763 B2 | 2/2006 | Sarkar et al. |
| 7,006,429 B2 | 2/2006 | Yoshida et al. |
| 7,012,912 B2 | 3/2006 | Naguib et al. |
| 7,016,651 B1 | 3/2006 | Narasimhan |
| 7,031,741 B2 | 4/2006 | Lee et al. |
| 7,047,473 B2 | 5/2006 | Hwang et al. |
| 7,050,406 B2 * | 5/2006 | Hsu et al. ............... 370/320 |
| 7,054,275 B2 | 5/2006 | Kim et al. |
| 7,061,986 B2 | 6/2006 | Tonissen et al. |
| 7,068,702 B2 | 6/2006 | Chen et al. |
| 7,069,038 B2 * | 6/2006 | Hakkinen et al. ............... 455/522 |
| 7,072,315 B1 | 7/2006 | Liu et al. |
| 7,076,001 B2 | 7/2006 | Beadle et al. |
| 7,092,706 B2 | 8/2006 | Yang |
| 7,099,397 B2 | 8/2006 | Lee et al. |
| 7,103,021 B2 | 9/2006 | Jou |
| 7,120,134 B2 | 10/2006 | Tiedemann, Jr. et al. |
| 7,126,928 B2 | 10/2006 | Tiedemann, Jr. et al. |
| 7,126,930 B2 | 10/2006 | Pankaj et al. |
| 7,155,236 B2 | 12/2006 | Chen et al. |
| 7,158,504 B2 | 1/2007 | Kadaba et al. |

| | | |
|---|---|---|
| 7,164,669 B2 | 1/2007 | Li et al. |
| 7,177,367 B2 | 2/2007 | Storm |
| 7,187,646 B2 | 3/2007 | Schramm |
| 7,190,964 B2 | 3/2007 | Damnjanovic et al. |
| 7,197,085 B1 | 3/2007 | Vella-Coleiro |
| 7,215,930 B2 | 5/2007 | Malladi |
| 7,245,600 B2 | 7/2007 | Chen |
| 7,257,101 B2 | 8/2007 | Petrus et al. |
| 7,269,186 B2 | 9/2007 | Abrol et al. |
| 7,269,389 B2 | 9/2007 | Petrus et al. |
| 7,272,199 B2 | 9/2007 | Storm et al. |
| 7,274,743 B2 | 9/2007 | Kim |
| 7,277,709 B2 | 10/2007 | Vadgama |
| 7,280,562 B2 | 10/2007 | Sindhushayana et al. |
| 7,286,558 B2 | 10/2007 | Kim et al. |
| 7,286,846 B2 | 10/2007 | Chen et al. |
| 7,289,529 B2 | 10/2007 | Sherman |
| 7,299,402 B2 | 11/2007 | Soong et al. |
| 7,313,167 B2 | 12/2007 | Yoon et al. |
| 7,315,527 B2 | 1/2008 | Wei et al. |
| 7,317,711 B2 | 1/2008 | Bae et al. |
| 7,327,716 B2 | 2/2008 | Fong et al. |
| 7,336,640 B2 | 2/2008 | McDonough et al. |
| 7,336,954 B2 | 2/2008 | Wang et al. |
| 7,418,064 B2 | 8/2008 | Wei et al. |
| 7,423,992 B2 | 9/2008 | Iwamura |
| 7,437,648 B2 | 10/2008 | Sarkar et al. |
| 7,447,258 B2 | 11/2008 | Pietila et al. |
| 7,447,287 B1 | 11/2008 | Parantainen |
| 7,463,702 B2 | 12/2008 | Ammer et al. |
| 7,505,780 B2 | 3/2009 | Wei et al. |
| 7,600,170 B2 | 10/2009 | Gaal et al. |
| 7,660,282 B2 | 2/2010 | Sarkar |
| 7,706,403 B2 | 4/2010 | Hosein |
| 8,023,950 B2 | 9/2011 | Malladi et al. |
| 8,150,407 B2 | 4/2012 | Ho et al. |
| 2001/0012271 A1 | 8/2001 | Berger |
| 2001/0019541 A1 | 9/2001 | Jou et al. |
| 2001/0021180 A1 | 9/2001 | Lee et al. |
| 2001/0055287 A1 | 12/2001 | Sawada et al. |
| 2002/0012334 A1 | 1/2002 | Strawczynski et al. |
| 2002/0015388 A1 | 2/2002 | Kim et al. |
| 2002/0018446 A1 | 2/2002 | Huh et al. |
| 2002/0021683 A1 | 2/2002 | Holtzman et al. |
| 2002/0021692 A1 | 2/2002 | Huh et al. |
| 2002/0042283 A1 | 4/2002 | Moulsley |
| 2002/0051432 A1 | 5/2002 | Shin |
| 2002/0057730 A1 | 5/2002 | Karlsson et al. |
| 2002/0067774 A1 | 6/2002 | Razoumov et al. |
| 2002/0089923 A1 | 7/2002 | Yoshida et al. |
| 2002/0093918 A1 | 7/2002 | Kim et al. |
| 2002/0111183 A1 | 8/2002 | Lundby |
| 2002/0131522 A1 | 9/2002 | Felgentreff |
| 2002/0136271 A1 | 9/2002 | Hiramatsu et al. |
| 2002/0137521 A1 | 9/2002 | Kim et al. |
| 2002/0150077 A1 | 10/2002 | Temerinac |
| 2002/0154610 A1 | 10/2002 | Tiedemann, Jr. et al. |
| 2002/0160767 A1 | 10/2002 | Hanly |
| 2002/0167907 A1 | 11/2002 | Sarkar et al. |
| 2002/0172192 A1 | 11/2002 | Hunzinger et al. |
| 2002/0172217 A1* | 11/2002 | Kadaba et al. ................ 370/443 |
| 2002/0172264 A1 | 11/2002 | Wiberg et al. |
| 2002/0176362 A1 | 11/2002 | Yun et al. |
| 2002/0183039 A1 | 12/2002 | Padgett et al. |
| 2002/0191570 A1 | 12/2002 | Kim et al. |
| 2002/0191677 A1 | 12/2002 | Chen et al. |
| 2003/0028251 A1 | 2/2003 | Mathews |
| 2003/0031130 A1 | 2/2003 | Vanghi |
| 2003/0035466 A1 | 2/2003 | Proctor, et al. |
| 2003/0039317 A1 | 2/2003 | Taylor et al. |
| 2003/0050084 A1 | 3/2003 | Damnjanovic et al. |
| 2003/0050086 A1 | 3/2003 | Lee et al. |
| 2003/0058822 A1 | 3/2003 | Jou |
| 2003/0058953 A1 | 3/2003 | Lee et al. |
| 2003/0067899 A9 | 4/2003 | Chen et al. |
| 2003/0072392 A1 | 4/2003 | Beadle et al. |
| 2003/0073443 A1 | 4/2003 | Bae et al. |
| 2003/0081538 A1 | 5/2003 | Walton et al. |
| 2003/0083069 A1 | 5/2003 | Vadgama |
| 2003/0087651 A1 | 5/2003 | Rauschmayer |
| 2003/0118086 A1 | 6/2003 | Pietila et al. |
| 2003/0123392 A1 | 7/2003 | Ruutu et al. |
| 2003/0129981 A1 | 7/2003 | Kim |
| 2003/0137953 A1 | 7/2003 | Chae et al. |
| 2003/0142656 A1 | 7/2003 | Padovani et al. |
| 2003/0152102 A1 | 8/2003 | Morgan et al. |
| 2003/0156593 A1 | 8/2003 | McDonough et al. |
| 2003/0161340 A1 | 8/2003 | Sherman |
| 2003/0210735 A1 | 11/2003 | Ahn et al. |
| 2003/0219037 A1* | 11/2003 | Toskala et al. ................ 370/496 |
| 2004/0001536 A1 | 1/2004 | Lohtia et al. |
| 2004/0013102 A1 | 1/2004 | Fong et al. |
| 2004/0091067 A1 | 5/2004 | Ammer et al. |
| 2004/0101035 A1* | 5/2004 | Boer et al. .................... 375/219 |
| 2004/0137931 A1 | 7/2004 | Sarkar et al. |
| 2004/0160914 A1 | 8/2004 | Sarkar |
| 2004/0160922 A1 | 8/2004 | Nanda et al. |
| 2004/0160933 A1 | 8/2004 | Odenwalder et al. |
| 2004/0162083 A1 | 8/2004 | Chen et al. |
| 2004/0162098 A1 | 8/2004 | Wei et al. |
| 2004/0203973 A1 | 10/2004 | Khan |
| 2004/0208139 A1 | 10/2004 | Iwamura |
| 2004/0224711 A1 | 11/2004 | Panchal et al. |
| 2004/0228288 A1 | 11/2004 | Seol et al. |
| 2004/0228349 A1 | 11/2004 | Vrzic et al. |
| 2004/0228389 A1 | 11/2004 | Odenwalder |
| 2005/0002324 A1 | 1/2005 | Sutivong et al. |
| 2005/0004970 A1 | 1/2005 | Jain et al. |
| 2005/0007986 A1 | 1/2005 | Malladi et al. |
| 2005/0176456 A1 | 8/2005 | Chen et al. |
| 2005/0254465 A1 | 11/2005 | Lundby et al. |
| 2006/0007892 A1 | 1/2006 | Sudo |
| 2006/0019701 A1 | 1/2006 | Ji |
| 2006/0128410 A1* | 6/2006 | Derryberry et al. .......... 455/509 |
| 2006/0165126 A1* | 7/2006 | Petersson et al. ............. 370/477 |
| 2006/0183497 A1 | 8/2006 | Paranchych et al. |
| 2006/0215737 A1 | 9/2006 | Bang et al. |
| 2006/0264220 A1 | 11/2006 | Chen et al. |
| 2007/0030820 A1 | 2/2007 | Sarkar et al. |
| 2007/0111669 A1 | 5/2007 | Malladi |
| 2007/0206623 A1 | 9/2007 | Tiedemann et al. |
| 2008/0043683 A1 | 2/2008 | Kwon et al. |
| 2008/0194286 A1 | 8/2008 | Chen et al. |
| 2009/0052573 A1 | 2/2009 | Tiedemann, Jr. et al. |
| 2009/0083602 A1 | 3/2009 | Sarkar et al. |
| 2010/0135156 A1 | 6/2010 | Sarkar |
| 2010/0309954 A1 | 12/2010 | Odenwalder |
| 2011/0009066 A1 | 1/2011 | Malladi |
| 2013/0022004 A1 | 1/2013 | Chen |

FOREIGN PATENT DOCUMENTS

| | | |
|---|---|---|
| EP | 0771084 A1 | 5/1997 |
| EP | 0783210 A2 | 7/1997 |
| EP | 0809364 A2 | 11/1997 |
| EP | 0912016 A2 | 4/1999 |
| EP | 0921652 A2 | 6/1999 |
| EP | 0996304 A1 | 4/2000 |
| EP | 1104127 | 5/2001 |
| EP | 0627827 | 10/2001 |
| EP | 1168703 A2 | 1/2002 |
| EP | 1231807 | 8/2002 |
| EP | 1236471 | 9/2002 |
| EP | 1248417 A2 | 10/2002 |
| EP | 1257140 A1 | 11/2002 |
| EP | 1292057 A1 | 3/2003 |
| EP | 1326471 | 12/2008 |
| GB | 2301687 A | 12/1996 |
| GB | 2352944 A | 2/2001 |
| JP | 4111553 A | 4/1992 |
| JP | 6350562 A | 12/1994 |
| JP | 08298498 A | 12/1996 |
| JP | 09312629 | 12/1997 |
| JP | 10013325 A | 1/1998 |
| JP | 11098120 A | 4/1999 |
| JP | 11154919 A | 6/1999 |
| JP | 11196043 | 7/1999 |
| JP | 11508417 T | 7/1999 |
| JP | 2000299680 A | 10/2000 |

| | | |
|---|---|---|
| JP | 2000513549 | 10/2000 |
| JP | 2000349740 | 12/2000 |
| JP | 2001016139 A | 1/2001 |
| JP | 2001036500 A | 2/2001 |
| JP | 2001238269 A | 8/2001 |
| JP | 2001515300 T | 9/2001 |
| JP | 2001517017 T | 10/2001 |
| JP | 2001523918 | 11/2001 |
| JP | 2002-026808 | 1/2002 |
| JP | 2002009734 A | 1/2002 |
| JP | 200277984 | 3/2002 |
| JP | 2002508137 T | 3/2002 |
| JP | 2002508896 T | 3/2002 |
| JP | 2002159061 A | 5/2002 |
| JP | 2002522988 T | 7/2002 |
| JP | 2002-232943 | 8/2002 |
| JP | 2002528954 T | 9/2002 |
| JP | 2002531992 | 9/2002 |
| JP | 2002534020 | 10/2002 |
| JP | 2002539672 A | 11/2002 |
| JP | 2003008521 A | 1/2003 |
| JP | 2003018117 | 1/2003 |
| JP | 2003032218 A | 1/2003 |
| JP | 2003060606 A | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 A | 7/2004 |
| JP | 2004320679 A | 11/2004 |
| JP | 2005-505955 | 2/2005 |
| JP | 2005505168 | 2/2005 |
| JP | 2008072733 A | 3/2008 |
| JP | 4755084 | 6/2011 |
| JP | 4824556 B2 | 11/2011 |
| KR | 19960015862 | 11/1996 |
| KR | 0156478 B1 | 11/1998 |
| KR | 100214293 | 5/1999 |
| KR | 20020074739 A | 10/2002 |
| KR | 20020076991 | 10/2002 |
| KR | 20020085674 A | 11/2002 |
| KR | 20020089164 | 11/2002 |
| KR | 20020092136 | 12/2002 |
| KR | 100406531 | 11/2003 |
| RU | 2073913 C1 | 2/1997 |
| RU | 2111619 C1 | 5/1998 |
| RU | 2115246 C1 | 7/1998 |
| RU | 2120198 C1 | 10/1998 |
| RU | 2149518 | 5/2000 |
| RU | 2183910 C2 | 6/2002 |
| RU | 2189696 C2 | 9/2002 |
| TW | 477129 | 2/2002 |
| TW | 481963 | 4/2002 |
| TW | 504914 | 10/2002 |
| WO | WO9205556 A1 | 4/1992 |
| WO | 9507578 | 3/1995 |
| WO | WO9510144 A1 | 4/1995 |
| WO | WO9512297 A1 | 5/1995 |
| WO | WO9701256 A1 | 1/1997 |
| WO | WO9733399 A1 | 9/1997 |
| WO | 9835525 | 8/1998 |
| WO | WO9836606 A2 | 8/1998 |
| WO | WO9845966 | 10/1998 |
| WO | WO9901994 A2 | 1/1999 |
| WO | WO9904525 | 1/1999 |
| WO | WO9907089 A1 | 2/1999 |
| WO | WO9912282 A1 | 3/1999 |
| WO | 9926371 | 5/1999 |
| WO | WO9929054 A1 | 6/1999 |
| WO | WO0008869 A2 | 2/2000 |
| WO | WO0038368 A1 | 6/2000 |
| WO | WO0038444 | 6/2000 |
| WO | WO0042752 A1 | 7/2000 |
| WO | WO0048328 A1 | 8/2000 |
| WO | 0054437 | 9/2000 |
| WO | 0072622 | 11/2000 |
| WO | WO0065743 A1 | 11/2000 |
| WO | WO0106714 | 1/2001 |
| WO | WO0110159 A1 | 2/2001 |
| WO | WO0117158 A1 | 3/2001 |
| WO | WO0124568 A1 | 4/2001 |
| WO | WO0128127 | 4/2001 |
| WO | WO01028194 A1 | 4/2001 |
| WO | WO0141318 A2 | 6/2001 |
| WO | 0180477 A1 | 10/2001 |
| WO | WO0180475 | 10/2001 |
| WO | WO0199303 A2 | 12/2001 |
| WO | WO00199312 A1 | 12/2001 |
| WO | WO0201762 A1 | 1/2002 |
| WO | WO0223792 A1 | 3/2002 |
| WO | WO0231991 | 4/2002 |
| WO | WO0233838 A2 | 4/2002 |
| WO | 0241531 | 5/2002 |
| WO | WO0237693 A2 | 5/2002 |
| WO | WO0237872 A2 | 5/2002 |
| WO | WO0239595 | 5/2002 |
| WO | 0249305 A2 | 6/2002 |
| WO | WO0245327 | 6/2002 |
| WO | WO02060142 A2 | 8/2002 |
| WO | WO02063818 A1 | 8/2002 |
| WO | WO02065664 A2 | 8/2002 |
| WO | WO02080400 A2 | 10/2002 |
| WO | WO02082108 A1 | 10/2002 |
| WO | WO02095960 | 11/2002 |
| WO | WO03003592 | 1/2003 |
| WO | WO03007530 A2 | 1/2003 |
| WO | 03038251 A1 | 4/2003 |
| WO | WO03084163 A1 | 10/2003 |
| WO | 05015942 | 2/2005 |
| WO | 2005015942 | 2/2005 |

OTHER PUBLICATIONS

International Preliminary Examination Report—PCT/US04/025375, IPEA/US, Jul. 20, 2006.

Gyung-Ho Hwang et al. "Distributed Rate Control for Throughput Maximization and QoS Support in WCDMA System", 2001 IEEE, Oct. 7-11, 2001, pp. 1721-1725.

"Universal Mobile Telecommunications System (UMTS): Physical channels and mapping of transport channels onto physical channels (FDD) (3GPP TS 25.211 version 5.3.0 Release 5)", ETSI TS 125 211 v 5.3.0 (Dec. 2002), pp. 1-52.

3GPP2 C.S0024: "cdma2000 High Rate Packet Data Air Interface Specification", 3rd Generation Partnership Project 2, "3GPP2" Sep. 12, 2000. pp. i-xxxix, 6-1-6-77, 8-1-8-54.

The CDMA 2000 ITU-R RTT Candidate Submission 0, 19 Online Jul. 27, 1998.

TIA/EIA/IS-856-1; "CDMA2000 High Rate Packet Data Air Interface Specification" Addendum 1 (Jun. 2002).

TIA/EIA-95; "Mobile Station—Base Station Compatibility Standard for Wideband Spread Spectrum Celluar Systems"(Apr. 1999).

TA EIA interim Standard IS-856-1, 'CDMA.2000 High Rate Packet Data Air Interface Specification. Addendum I,' Jan. 2002. pp. 9-23-9-57, XP002299790.

"Mobile Station-Base Station Compatibility Standard for Wideband Spread Spectrum Cellular Systems," TIA/EIA Interim Standard, Feb. 3, 1999, XP002145331, pp. 6-380,6 (TIA/EIA-95-B).

"The CDMA 2000 ITU-R RTT Candidate Submission (0.18)," Telecommunications Industry Association TIA, Jul. 27, 1998, XP002294165, pp. 1-145.

3G TS 25.211 "Physical channels and mapping of transport channels onto physical channels (FDD)", Release 5, V5.0.0, Mar. 2002.

3G TS 25.212 "Multiplexing and channel coding (FDD)", Release 5, V5.0.0, Mar. 2002.

3G TS 25.213 "Spreading and modulation (FDD)", Release 5, V5.0.0, Mar. 2002.

3G TS 25.214 "Physical layer procedures (FDD)", Release 5, V5.0.0, Mar. 2002.

3rd Generation Partnership Project, Technical Specification Group Radio Access Network: 3GPP TS 25.322 V4.7.0; Radio Access Link Control (RLC) Protocol Specification; Release 4, Dec. 2002, pp. 1-76.

Attar R.A et al. A reverse link outer-loop power control algorithm for cdma2000 1xEV systems, ICC 2002. 2002 IEEE International Conference on Communications, New York. NY, vol. 1 of 5. Apr. 28, 2002, pp. 573-578. XP010589559.

Chen, Tau, "Method and Apparatus for Forward Link Power Control During Soft Handoff in a Communication System", U.S. Appl. No. 60/356,929 entitled, filed Feb. 12, 2002, QUALCOMM Incorporated.

Hamaguchi, et al., "Characteristics of Orthogonal Slow-FH/16QAM method applying Interference-resistant Demodulation," Proceedings of Inst. of Electronics, Information and Communication Engineers, B-II, Jun. 25, 1995, vol. J78, B-II, No. 6, pp. 445-453.

Sarkar S et al., "Adaptive Control of the Reverse Link in CDMA 2000", International Journal of Wireless Information Networks, Plenum Press, NY, US, vol. 9, No. Jan. 1, 2002, pp. 55-70, XP002300880, ISSN: 1068-9605.

Sarkar S., et al., "CDMA2000 Reverse Link: Design and System Performance" VTC 2000-Fall. IEEE VTS 52nd, Vehicular Technology Conference, Boston, MA, Sep. 24-28, 2000. vol. 6 of 6 Conf. 52, pp. 2713-2719.

Sohn et al., "Blind Rate Detection Algorithm in WCDMA Mobile Receiver", IEEE 54th Vehicular Technology Conference Proceedings, Atlantic City, NJ, Oct. 7, 2001, pp. 1589-1592.

Sunay, M, Oguz, et al.: "Provision of Variable Data Rates in Third Generation Wideband DS CDMA System," wireless Communications and Networking Conference, 1999, Sep. 21, 1999, pp. 505-509.

You Y--H, et al.: MC-VSG BNET System for High-Rate Wireless Personal Area Network Applications, IEEE Transactions on Consumer Electronics, IEEE Inc., New York US, vol. 48, No. 2, May 2002, pp. 254-264.

Young-UK Chung et al, "An Efficient Reverse Link Data Rate Control Scheme for 1xEV-DV System," IEEE 54th. Vehicular Technology Conference Proceedings. Atlantic City, NJ, Oct. 7-11, 2001. IEEE, US. vol. 1 of 4, Conf. 54, Oct. 10, 2001, pp. 820-823.

3GPP2 C: "CDMA 2000 High Rate Packet Data Air Interface Specification C.S0024" 3GPP STANDARDS, Sep. 12, 2000, XP002206456 cited in the application.

Chakravarty S et al: An Algorithm for Reverse Traffic Channel Rate Control for CDMA 2000 High Rate Packet Data Systems "GLOBECOM"OI. 2001 IEEE GLOBAL Telecommunications Conference. San Antonio, TX, Nov. 25-29, 2001, IEEEGLOBAL Telecommunications Conference, NewYork, NY: IEEE, US, x vol. vol. 6 of 6, Nov. 25, 2001, pp. 3733-3737, XP002277693.

Taiwanese Search report—093103844—TIPO—Oct. 21, 2010.

3GPP2 C.S0024, Version 2.0: "cdma2000 High Rate Packet Data Air Interface Specification," pp. 1-441 (Oct. 27, 2000).

ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).

European Search Report—EP10172964, Search Authority—Berlin Patent Office, Sep. 28, 2010.

Fujii, T. at al., "Best Effort Cell Structure Using Sub-carrier Selection MC-CDMA System," The Institute of Electronics, Information, and Communication Engineers, Nov. 15, 2002, vol. 102, No. 465, pp. 65-72, IEICE Technical Report RCS 2002-203 (English Abstract).

Sklar, B. "Digital Communications, Fundamentals and Applications", 4 pages, 2001. Prentice-Hall PTR. Upper Saddle River, New Jersey, USA.

TIA/EIA-IS-2000 Release C. "Introduction to cdma2000 Standards for Spread Spectrum Systems, Release C" (3GPP2 C.S0001-C, Version 1.0) May 28, 2002.

Adachi, F. et al: "Wideband Multi-rate DS-CDMA for Next Generation Mobile Communications Systems", Wireless Communications Conference (1997), Boulder, CO, USA Aug. 11-13, 1997, NewYork, NY, USA, IEEE, US, Aug. 11, 1997, pp. 57-62, XP010245557, DOI: DOI:10.1109/WCC.1997.622247, ISBN:978-0-7803-41 94-4.

Schreiber, W. F: "Spread-Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.

Translation of Office Action in Japanese application 2006-522734 corresponding to U.S. Appl. No. 10/783,083, citing JP2002534020 dated Jan. 25, 2011.

Chen, Tau, "Method and Apparatus for Foward Link Power Control During Soft Handoff in a Communication System", U.S. Appl. No. 60/356,929 entitled, filed Feb. 12, 2002, QUALCOMM Incorporated.

European Search Report—EP10179617, Search Authority—Munich Patent Office, Nov. 5, 2010.

Taiwan Search Report—TW093123293—TIPO—Mar. 21, 2011.

International Search Report, PCT/US04/025375, ISA-EPO Dec. 22, 2004.

Nandagopal T et al: "Service differentiation through end-to-end rate control in low bandwidth wireless packet networks" Mobile Multimedia Communications, 1999. 1999 IEEE International workshop on San Diego, CA USA Nov. 15-17, 1999 Piscataway, NJ, USA IEEE, U.S. Nov. 15, 1999, pp. 211-220.

Young-Joo Song et al: "Rate-Control snoop: a reliable transport protocol for heterogeneous networks with wired and wireless links" IEEE Proceedings 2003, vol. 2, Mar. 16, 2003 pp. 1334-1338.

Brouwer A E et al: "An Updated Table of Minimum-Distance Bounds for Binary Linear Codes" IEEE Transactions on Information Theory, IEEE Service Center, Piscataway, NJ, US, vol. 39, No. 2, Mar. 1, 1993, pp. 662-677, XP000377724 ISSN: 0018-9448.

MacWilliams F. J.; Sloane N.J.A.: "The Theory of Error-Correcting Codes, pp. 23, 24" 1977, North-Holland, Amsterdam, XP002366024.

Morelos-Zaragoza R. H.: "The Art of Error Correcting Coding, pp. 101-120" 2002, John Wiley and Sons, New York, XP002366026, cited by other.

Morelos-Zaragoza R.H.: "The Art of Error Correcting Coding, pp. 16,35" 2002, John Wiley and Sons, New York, XP002366025.

Strawczynski et al. "Multi User Frame Structure for 1XEV Forward Link," 3GPP2 cdma2000 TSG-C, Nortel Networks, 2000, pp. 1-6.

Balasubramanian S. et al., "QoS support for Enhanced Reverse Link-Control and Feedback", 3GPP2-Drafts, 2500 Wilson Boulevard, Suite 300, Arlington, Virginia 22201 USA, [Online] Sep. 15, 2003, pp. 1-18, XP040345576, Retrieved from the Internet: URL:http:l/ftp.3gpp2.org/TSGC/working/2003/2003-09-Calagry/TSGC-0309 Calgary/WG3/[retrieved on Sep. 18, 2012).

Soong, A., "Reverse Link enhancements for CDMA2000 1x Revision D (E-REX) R1", 3GPP2-Drafts, 2500 Wilson Boulevard, Suite300, Arlington, Virginia 22201 USA, [Online] Feb. 17, 2003, pp. 1-14, XP040264591, Retrieved from the Internet:URL:http://ftp.3gpp2.org/TSGC/working/2003/2003-02-LosAngelas/TSG-C-2003-02-LA/WG3/[retrieved on Sep. 18, 2012].

Wei Y., et al., "Qualcomm's Interpretation of the MAC Logic for the Harmonized Control Mechanism", 3GPP2 Drafts, 2500 Wilson Boulevard, Suite 300, Arlington, Virginia 22201 USA, [Online] Aug. 18, 2003 (Aug. 18, 2003, pp. 1-9, XP040264988, Retrieved from the Internet: URL:http://ftp.3gpp2.org/TSGC/working/2003/2003-08-Seoui/TSG-C-2003-08-Seou I/WG3/C30-20030818-067-Detai led%20ControL%20Mechanism.pdf[retrieved on Sep. 18, 2012].

Yoon V.C., et al., "Reverse Link Enhancements for CDMA2000 1x Revision D (E-Rex) R2", 3GPP2-DRAFTS, 2500 Wilson Boulevard, Suite 300, Arlington, Virginia 22201 USA, Aug. 18, 2003, pp. 1-38, XP040264985, Retrieved from the Internet: URL:http://ftp.3gpp2.org/TSGC/working/2003/2003-08-Seoul/TSG-C-2003-08 Seoui/WG3/C30-20030818-012%20 E-REX%2011%20writeup.pdf [retrieved on Sep. 18, 2012].

* cited by examiner

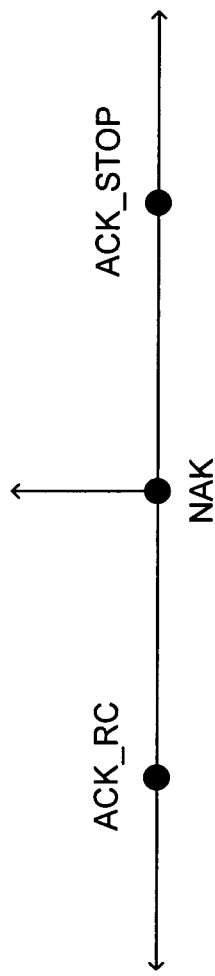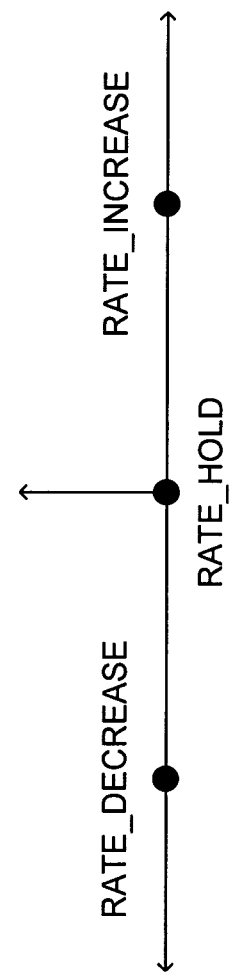
FIG. 5
FIG. 6

COMBINING GRANT, ACKNOWLEDGEMENT, AND RATE CONTROL COMMANDS

Claim of Priority under 35 U.S.C. §119

The present Application for Patent claims priority to Provisional Application No. 60/493,046 entitled "Reverse Link Rate Control for CDMA 2000 Rev D" filed Aug. 5, 2003, and Provisional Application No. 60/496,297, entitled "Reverse Link Rate Control for CDMA 2000 Rev D", filed Aug. 18, 2003.

BACKGROUND

1. Field

The present invention relates generally to wireless communications, and more specifically to combining grant, acknowledgement, and rate control channels.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), (4) the high data rate (HDR) system that conforms to the TIA/EIA/IS-856 standard (the IS-856 standard), and (5) Revision C of the IS-2000 standard, including C.S0001.C through C.S0006.C, and related documents (including subsequent Revision D submissions) are referred to as the 1xEV-DV proposal.

In an example system, Revision D of the IS-2000 standard (currently under development), the transmission of mobile stations on the reverse link is controlled by the base stations. A base station may decide the maximum rate or Traffic-to-Pilot Ratio (TPR) at which a mobile station is allowed to transmit. Currently proposed are two types of control mechanisms: grant based and rate-control based.

In grant-based control, a mobile station feeds back to a base station information on the mobile station's transmit capability, data buffer size, and Quality of Service (QoS) level, etc. The base station monitors feedback from a plurality of mobile stations and decides which are allowed to transmit and the corresponding maximum rate allowed for each. These decisions are delivered to the mobile stations via grant messages.

In rate-control based control, a base station adjusts a mobile station's rate with limited range (i.e. one rate up, no change, or one rate down). The adjustment command is conveyed to the mobile stations using a simple binary rate control bit or multiple-valued indicator.

Under full buffer conditions, where active mobile stations have large amounts of data, grant based techniques and rate control techniques perform roughly the same. Ignoring overhead issues, the grant method may be better able to control the mobile station in situations with real traffic models. Ignoring overhead issues, the grant method may be better able to control different QoS streams. Two types of rate control may be distinguished, including a dedicated rate control approach, giving every mobile station a single bit, and common rate control, using a single bit per sector. Various hybrids of these two may assign multiple mobile stations to a rate control bit. A common rate control approach may require less overhead. However, it may offer less control over mobile stations when contrasted with a more dedicated control scheme. As the number of mobiles transmitting at any one time decreases, then the common rate control method and the dedicated rate control approach each other.

Grant based techniques can rapidly change the transmission rate of a mobile station. However, a pure grant based technique may suffer from high overhead if there are continual rate changes. Similarly, a pure rate control technique may suffer from slow ramp-up times and equal or higher overheads during the ramp-up times.

Neither approach provides both reduced overhead and large or rapid rate adjustments. There is therefore a need in the art for reduced overhead control with the ability to adjust transmission rates as necessary.

SUMMARY

Embodiments disclosed herein address the need in the art for reduced overhead control with the ability to adjust transmission rates as necessary. In one aspect, a first signal indicates an acknowledgement of a decoded subpacket and whether or not a rate control command is generated, and a second signal conditionally indicates the rate control command when one is generated. In another aspect, a grant may be generated concurrently with the acknowledgement. In yet another aspect, a mobile station monitors the first signal, conditionally monitors the second signal as indicated by the first signal, and may monitor a third signal comprising a grant. In yet another aspect, one or more base stations transmit one or more of the various signals. Various other aspects are also presented. These aspects have the benefit of providing the flexibility of grant-based control while utilizing lower overhead when rate control commands are used, thus increasing system utilization, increasing capacity and throughput.

BRIEF DESCRIPTION OF THE DRAWINGS

FIG. 5 is an exemplary acknowledgement channel;

FIG. 6 is an exemplary rate control channel;

DETAILED DESCRIPTION

Example embodiments, detailed below, provide for allocation of a shared resource, such as shared by one or more mobile stations in a communication system, by advantageously controlling or adjusting one or more data rates in connection with various acknowledgment messages communicated in the system.

Techniques for combining the use of grant channels, acknowledgement channels, and rate control channels to provide for a combination of grant based scheduling and rate controlled scheduling, and the benefits thereof, are disclosed herein.

Various embodiments may allow for one or more of the following benefits: increasing the transmission rate of a mobile station quickly, quickly stopping a mobile station from transmitting, low-overhead adjustments of a mobile station's rate, low-overhead mobile station transmission acknowledgement, low overhead overall, and Quality of Service (QoS) control for streams from one or mobile stations. Various other benefits will be detailed below.

One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
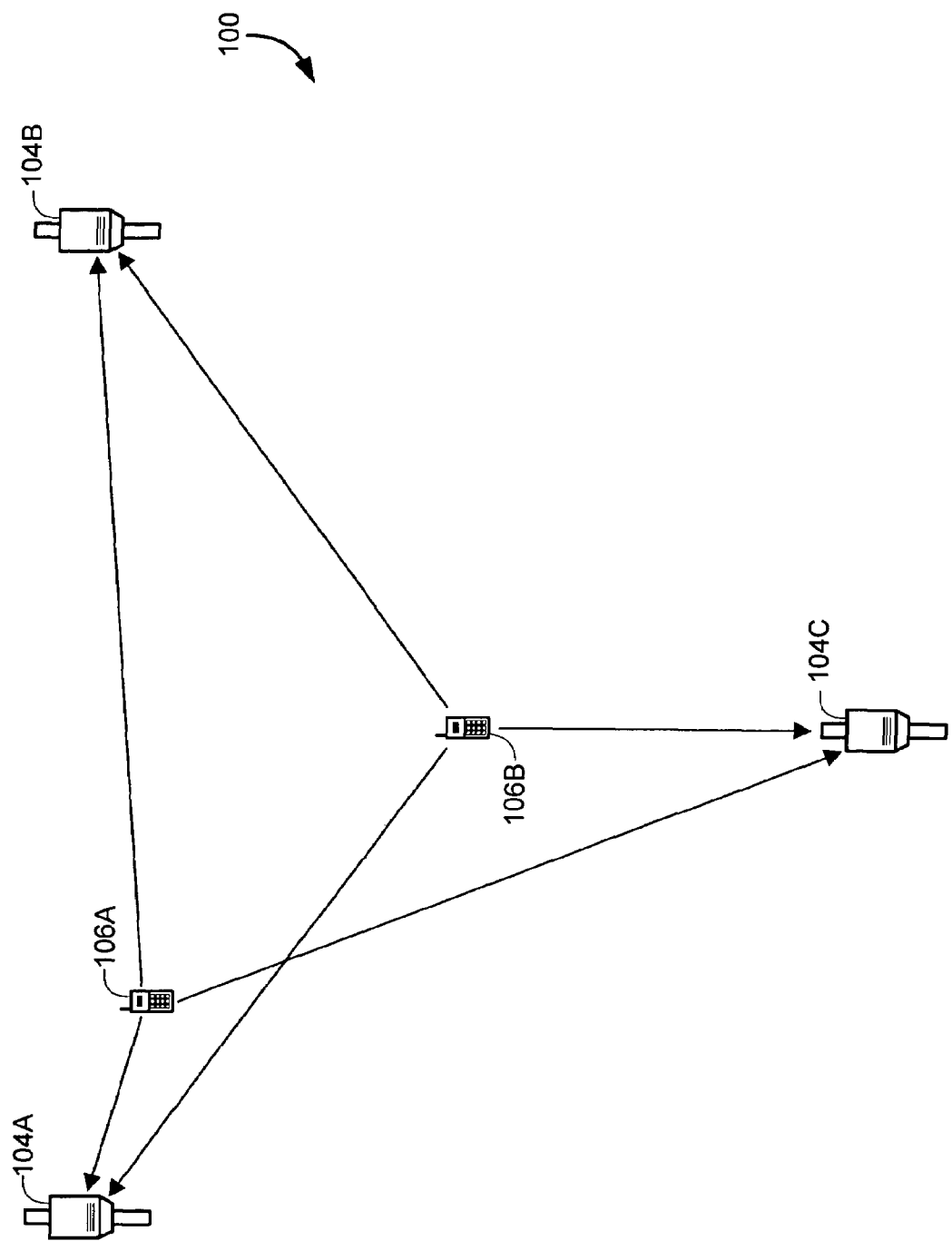
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV system). In an alternative embodiment, system 100 may additionally support any wireless standard or design other than a CDMA system. In the exemplary embodiment, system 100 is a 1xEV-DV system.

For simplicity, system 100 is shown to include three base stations 104 in communication with two mobile stations 106. The base station and its coverage area are often collectively referred to as a "cell". In IS-95, cdma2000, or 1xEV-DV systems, for example, a cell may include one or more sectors. In the W-CDMA specification, each sector of a base station and the sector's coverage area is referred to as a cell. As used herein, the term base station can be used interchangeably with the terms access point or Node B. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

While the various embodiments described herein are directed to providing reverse-link or forward-link signals for supporting reverse link transmission, and some may be well suited to the nature of reverse link transmission, those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

1xEV-DV Forward Link Data Transmission

A system 100, such as the one described in the 1xEV-DV proposal, generally comprises forward link channels of four classes: overhead channels, dynamically varying IS-95 and IS-2000 channels, a Forward Packet Data Channel (F-PDCH), and some spare channels. The overhead channel assignments vary slowly; for example, they may not change for months. They are typically changed when there are major network configuration changes. The dynamically varying IS-95 and IS-2000 channels are allocated on a per call basis or are used for IS-95, or IS-2000 Release 0 through B voice and packet services. Typically, the available base station power remaining after the overhead channels and dynamically varying channels have been assigned is allocated to the F-PDCH for remaining data services The F-PDCH, similar to the traffic channel in the IS-856 standard, is used to send data at the highest supportable data rate to one or two users in each cell at a time.

In IS-856, the entire power of the base station and the entire space of Walsh functions are available when transmitting data to a mobile station. However, in a 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In a 1xEV-DV system, the base station generally transmits to one mobile station on the F-PDCH at a time, although many users may be using packet services in a cell. (It is also possible to transmit to two users by scheduling transmissions for the two users, and allocating power and Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel (R-CQICH). The scheduling algorithm is used to determine the mobile station selected for transmission, as well as the appropriate rate and transmission format in accordance with the channel quality.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system that divides the communication resource between both types of access, and dynamically allocates the apportionment according to user demand. An exemplary forward-link embodiment has just been described. Various exemplary reverse-link embodiments are detailed further below.

Figure 2:
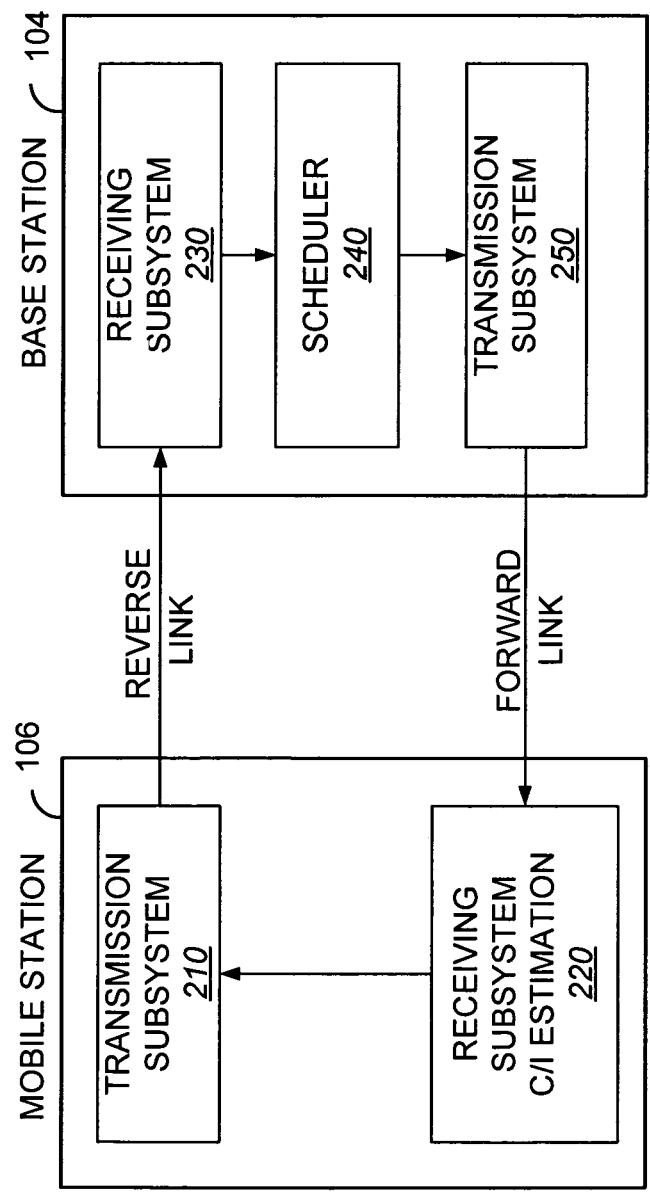
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics can be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm can be deployed within the scope of the present invention. One example is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention.

In an example 1xEV-DV embodiment, a mobile station is selected for forward link transmission when the C/I measurement received from that mobile station indicates that data can be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user. It may be that a mobile station, not with the greatest reported C/I, is selected for transmission to maintain certain fairness criterion among all users.

In the example 1xEV-DV system, scheduler 240 determines which mobile station to transmit to, and also the data rate, modulation format, and power level for that transmission. In an alternate embodiment, such as an IS-856 system, for example, a supportable rate/modulation format decision can be made at the mobile station, based on channel quality measured at the mobile station, and the transmit format can be transmitted to the serving base station in lieu of the C/I measurement. Those of skill in the art will recognize myriad combinations of supportable rates, modulation formats, power levels, and the like which can be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or F-PDCCH, are transmitted along with data on the data channel, or F-PDCH. The control channel can be used to identify the recipient mobile station of the data on the F-PDCH, as well as identifying other communication parameters useful during the communication session. A mobile station should receive and demodulate data from the F-PDCH when the F-PDCCH indicates that mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from disparately located base stations would require significant network communication bandwidth with very little delay, and so the example systems listed above do not support it. In softer handoff, reverse link signals received at multiple sectors in a single BTS can be combined without network signaling. While any type of reverse link signal combining may be deployed within the scope of the present invention, in the example systems described above, reverse link power control maintains quality such that reverse link frames are successfully decoded at one BTS (switching diversity).

Reverse link data transmission may be carried out in system 100 as well. The receiving and transmission subsystems 210-230, and 250, described may be deployed to send control signals on the forward link to direct data transmission on the reverse link. Mobile stations 106 may transmit control information on the reverse link as well. Various mobile stations 106 communicating with one or more base stations 104 may access the shared communication resource (i.e. the reverse link channel, which may be variably allocated, as in 1xEV-DV, or a fixed allocation, as in IS-856), in response to various access control and rate control techniques, examples of which are detailed below. Scheduler 240 may be deployed to determine the allocation of reverse link resources. Example control and data signals for reverse link data communication are detailed below.

Example Base Station and Mobile Station Embodiments

Figure 3:
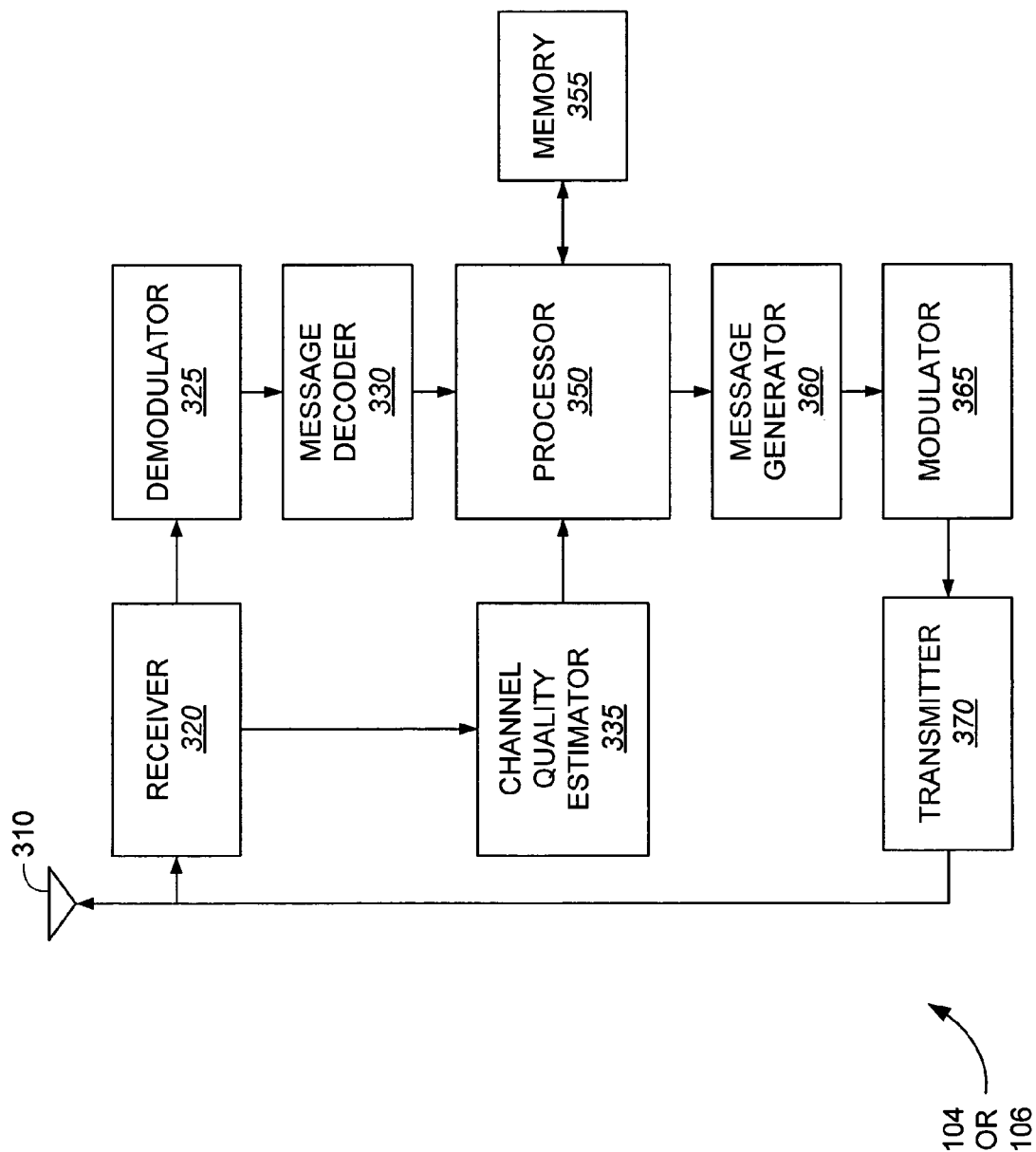
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that can be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various types of control messages may be decoded in either a base station 104 or mobile station 106 as transmitted on the reverse or forward links, respectively. For example, described below are request messages and grant messages for scheduling reverse link data transmission for generation in a mobile station or base station, respectively. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples). Various signals and messages for use in embodiments disclosed herein are detailed further below.

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. In a base station 104 or mobile station 106, signal strength estimations, such as received pilot power can be made. Channel quality estimator 335 is shown as a discrete block for clarity of discussion only. It is common for such a block to be incorporated within another block, such as receiver 320 or demodulator 325. Various types of signal strength estimates can be made, depending on which signal or which system type is being estimated. In general, any type of channel quality metric estimation block can be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to a desired set point. The desired set point may be determined with an outer loop power control mechanism.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels can be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components, which may be incorporated in modulator 365, include encoders, interleavers, spreaders, and modulators of various types. A reverse link design, including example modulation formats and access control, suitable for deployment on a 1xEV-DV system is also described below.

Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively. For example, described below are request messages and grant messages for scheduling reverse link data transmission for generation in a mobile station or base station, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in-these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which can be used for storing data as well as instructions for performing the various procedures and methods described herein. Those of skill in the art will recognize that memory 355 may be comprised of one or more memory components of various types, that may be embedded in whole or in part within processor 350.

A typical data communication system may include one or more channels of various types. More specifically, one or more data channels are commonly deployed. It is also common for one or more control channels to be deployed, although in-band control signaling can be included on a data channel. For example, in a 1xEV-DV system, a Forward Packet Data Control Channel (F-PDCCH) and a Forward Packet Data Channel (F-PDCH) are defined for transmission of control and data, respectively, on the forward link. Various example channels for reverse link data transmission are detailed as follows.

1xEV-DV Reverse Link Design Considerations

In this section, various factors considered in the design of an example embodiment of a reverse link of a wireless communication system are described. In many of the embodiments, detailed further in following sections, signals, parameters, and procedures associated with the 1xEV-DV standard are used. This standard is described for illustrative purposes only, as each of the aspects described herein, and combinations thereof, may be applied to any number of communication systems within the scope of the present invention. This section serves as a partial summary of various aspects of the invention, although it is not exhaustive. Example embodiments are detailed further in subsequent sections below, in which additional aspects are described.

In many cases, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resource involves several factors. One factor to consider is the mix of scheduled reverse link transmissions from various mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, mobile stations may be granted access at the highest rate they can support, and additional mobile stations may be granted access until capacity is reached. One factor a base station may consider in deciding which mobile stations to schedule is the maximum rate each mobile can support and the amount of data each mobile station has to send. A mobile station capable of higher throughput may be selected instead of an alternate mobile station whose channel does not support the higher throughput.

Another factor to be considered is the quality of service required by each mobile station. While it may be permissible to delay access to one mobile station in hopes that the channel will improve, opting instead to select a better situated mobile station, it may be that suboptimal mobile stations may need to be granted access to meet minimum quality of service guarantees. Thus, the data throughput scheduled may not be the absolute maximum, but rather maximized considering channel conditions, available mobile station transmit power, and service requirements. It is desirable for any configuration to reduce the signal to noise ratio for the selected mix.

Various scheduling mechanisms are described below for allowing a mobile station to transmit data on the reverse link. One class of reverse link transmission involves the mobile station making a request to transmit on the reverse link. The base station makes a determination of whether resources are available to accommodate the request. A grant can be made to allow the transmission. This handshake between the mobile station and the base station introduces a delay before the reverse link data can be transmitted. For certain classes of reverse link data, the delay may be acceptable. Other classes may be more delay-sensitive, and alternate techniques for reverse link transmission are detailed below to mitigate delay.

In addition, reverse link resources are expended to make a request for transmission, and forward link resources are expended to respond to the request, i.e. transmit a grant. When a mobile station's channel quality is low, i.e. low geometry or deep fading, the power required on the forward link to reach the mobile may be relatively high. Various techniques are detailed below to reduce the number or required transmit power of requests and grants required for reverse link data transmission.

To avoid the delay introduced by a request/grant handshake, as well as to conserve the forward and reverse link resources required to support them, an autonomous reverse link transmission mode is supported. A mobile station may transmit data at a limited rate on the reverse link without making a request or waiting for a grant.

It may also be desirable to modify the transmission rate of a mobile station that is transmitting in accordance with a grant, or autonomously, without the overhead of a grant. To accomplish this, rate control commands may be implemented along with autonomous and request/grant based scheduling.

For example, a set of commands may include a command to increase, decrease and hold steady the current rate of transmission. Such rate control commands may be addressable to each mobile station individually, or to groups of mobile stations. Various example rate control commands, channels, and signals are detailed further below.

The base station allocates a portion of the reverse link capacity to one or more mobile stations. A mobile station that is granted access is afforded a maximum power level. In the example embodiments described herein, the reverse link resource is allocated using a Traffic to Pilot (T/P) ratio. Since the pilot signal of each mobile station is adaptively controlled via power control, specifying the T/P ratio indicates the available power for use in transmitting data on the reverse link. The base station may make specific grants to one or more mobile stations, indicating a T/P value specific to each mobile station. The base station may also make a common grant to the remaining mobile stations, which have requested access, indicating a maximum T/P value that is allowed for those remaining mobile stations to transmit. Autonomous and scheduled transmission, individual and common grants, and rate control are detailed further below.

Various scheduling algorithms are known in the art, and more are yet to be developed, which can be used to determine the various specific and common T/P values for grants as well as desired rate control commands in accordance with the number of registered mobile stations, the probability of autonomous transmission by the mobile stations, the number and size of the outstanding requests, expected average response to grants, and any number of other factors. In one example, a selection is made based on Quality of Service (QoS) priority, efficiency, and the achievable throughput from the set of requesting mobile stations. One example scheduling technique is disclosed in co-pending U.S. patent application Ser. No. 10/651,810, entitled "SYSTEM AND METHOD FOR A TIME-SCALABLE PRIORITY-BASED SCHEDULER", filed Aug. 28, 2003, assigned to the assignee of the present invention. Additional references include U.S. Pat. No. 5,914,950, entitled "METHOD AND APPARATUS FOR REVERSE LINK RATE SCHEDULING", and U.S. Pat. No. 5,923,650, also entitled "METHOD AND APPARATUS FOR REVERSE LINK RATE SCHEDULING", both assigned to the assignee of the present invention.

A mobile station may transmit a packet of data using one or more subpackets, where each subpacket contains the complete packet information (each subpacket is not necessarily encoded identically, as various encoding or redundancy may be deployed throughout various subpackets). Retransmission techniques may be deployed to ensure reliable transmission, for example Automatic Repeat reQuest (ARQ). Thus, if the first subpacket is received without error (using a CRC, for example), a positive Acknowledgement (ACK) is sent to the mobile station and no additional subpackets will be sent (recall that each subpacket comprises the entire packet information, in one form or another). If the first subpacket is not received correctly, then a Negative Acknowledgement signal (NAK) is sent to the mobile station, and the second subpacket will be transmitted. The base station can combine the energy of the two subpackets and attempt to decode. The process may be repeated indefinitely, although it is common to specify a maximum number of subpackets. In example embodiments described herein, up to four subpackets may be transmitted. Thus, the probability of correct reception increases as additional subpackets are received. Detailed below are various ways to combine ARQ responses, rate control commands, and grants, to provide the desired level of flexibility in transmission rates with acceptable overhead levels.

As just described, a mobile station may trade off throughput for latency in deciding whether to use autonomous transfer to transmit data with low latency or requesting a higher rate transfer and waiting for a common or specific grant. In addition, for a given T/P, the mobile station may select a data rate to suit latency or throughput. For example, a mobile station with relatively few bits for transmission may decide that low latency is desirable. For the available T/P (probably the autonomous transmission maximum in this example, but could also be the specific or common grant T/P), the mobile station may select a rate and modulation format such that the probability of the base station correctly receiving the first subpacket is high. Although retransmission will be available if necessary, it is likely that this mobile station will be able to transmit its data bits in one subpacket. In various example embodiments described herein, each subpacket is transmitted over a period of 5 ms. Therefore, in this example, a mobile station may make an immediate autonomous transfer that is likely to be received at the base station following a 5 ms interval. Note that, alternatively, the mobile station may use the availability of additional subpackets to increase the amount of data transmitted for a given T/P. So, a mobile station may select autonomous transfer to reduce latency associated with requests and grants, and may additionally trade the throughput for a particular T/P to minimize the number of subpackets (hence latency) required. Even if the full number of subpackets is selected, autonomous transfer will be lower latency than request and grant for relatively small data transfers. Those of skill in the art will recognize that as the amount of data to be transmitted grows, requiring multiple packets for transmission, the overall latency may be reduced by switching to a request and grant format, since the penalty of the request and grant will eventually be offset by the increased throughput of a higher data rate across multiple packets. This process is detailed further below, with an example set of transmission rates and formats that can be associated with various T/P assignments.

Reverse Link Data Transmission

One goal of a reverse link design may be to maintain the Rise-over-Thermal (RoT) at the base station relatively constant as long as there is reverse link data to be transmitted. Transmission on the reverse link data channel is handled in three different modes:

Autonomous Transmission: This case is used for traffic requiring low delay. The mobile station is allowed to transmit immediately, up to a certain transmission rate, determined by the serving base station (i.e. the base station to which the mobile station directs its Channel Quality Indicator (CQI)). A serving base station is also referred to as a scheduling base station or a granting base station. The maximum allowed transmission rate for autonomous transmission may be signaled by the serving base station dynamically based on system load, congestion, etc.

Scheduled Transmission: The mobile station sends an estimate of its buffer size, available power, and possibly other parameters. The base station determines when the mobile station is allowed to transmit. The goal of a scheduler is to limit the number of simultaneous transmissions, thus reducing the interference between mobile stations. The scheduler may attempt to have mobile stations in regions between cells transmit at lower rates so as to reduce interference to neighboring cells, and to tightly control RoT to protect the voice quality on the R-FCH, the DV feedback on R-CQICH and the acknowledgments (R-ACKCH), as well as the stability of the system.

Rate Controlled Transmission: Whether a mobile station transmits scheduled (i.e. granted) or autonomously, a base station may adjust the transmission rate via rate control commands. Example rate control commands include increasing, decreasing, or holding the current rate. Additional commands may be included to specify how a rate change is to be implemented (i.e. amount of increase or decrease). Rate control commands may be probabilistic or deterministic.

Various embodiments, detailed herein, contain one or more features designed to improve throughput, capacity, and overall system performance of the reverse link of a wireless communication system. For illustrative purposes only, the data portion of a 1xEV-DV system, in particular, optimization of transmission by various mobile stations on the Enhanced Reverse Supplemental Channel (R-ESCH), is described. Various forward and reverse link channels used in one or more of the example embodiments are detailed in this section. These channels are generally a subset of the channels used in a communication system.

Figure 4:
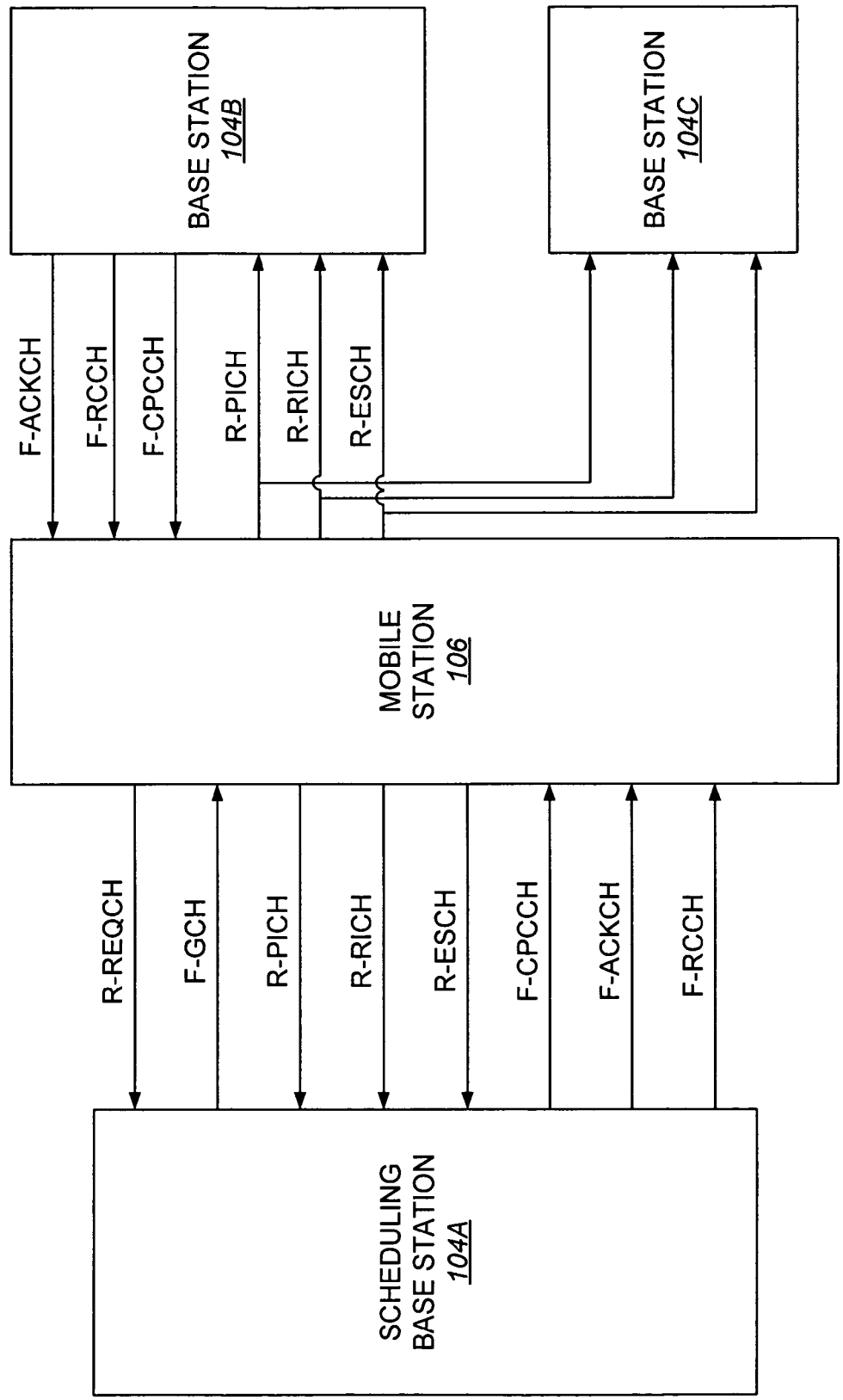
FIG. 4 depicts an exemplary embodiment of data and control signals for reverse link data communication.

FIG. 4 depicts an exemplary embodiment of data and control signals for reverse link data communication. A mobile station 106 is shown communicating over various channels, each channel connected to one or more base stations 104A-104C. Base station 104A is labeled as the scheduling base station. The other base stations 104B and 104C are part of the Active Set of mobile station 106. There are four types of reverse link signals and four types of forward link signals shown. They are described below.

R-REQCH

The Reverse Request Channel (R-REQCH) is used by the mobile station to request from the scheduling base station a reverse link transmission of data. In the example embodiment, requests are for transmission on the R-ESCH (detailed further below). In the example embodiment, a request on the R-REQCH includes the T/P ratio the mobile station can support, variable according to changing channel conditions, and the buffer size (i.e. the amount of data awaiting transmission). The request may also specify the Quality of Service (QoS) for the data awaiting transmission. Note that a mobile station may have a single QoS level specified for the mobile station, or, alternately, different QoS levels for different types of service options. Higher layer protocols may indicate the QoS, or other desired parameters (such as latency or throughput requirements) for various data services. In an alternative embodiment, a Reverse Dedicated Control Channel (R-DCCH), used in conjunction with other reverse link signals, such as the Reverse Fundamental Channel (R-FCH) (used for voice services, for example), may be used to carry access requests. In general, access requests may be described as comprising a logical channel, i.e. a Reverse Schedule Request Channel (R-SRCH), which may be mapped onto any existing physical channel, such as the R-DCCH. The example embodiment is backward compatible with existing CDMA systems such as IS-2000 Revision C, and the R-REQCH is a physical channel that can be deployed in the absence of either the R-FCH or the R-DCCH. For clarity, the term R-REQCH is used to describe the access request channel in embodiment descriptions herein, although those of skill in the art will readily extend the principles to any type of access request system, whether the access request channel is logical or physical. The R-REQCH may be gated off until a request is needed, thus reducing interference and conserving system capacity.

In the example embodiment, the R-REQCH has 12 input bits that consist of the following: 4 bits to specify the maximum R-ESCH T/P ratio that the mobile can support, 4 bits to specify the amount of data in the mobile's buffer, and 4 bits to specify the QoS. Those of skill in the art will recognize that any number of bits and various other fields may be included in alternate embodiments.

F-GCH

The Forward Grant Channel (F-GCH) is transmitted from the scheduling base station to the mobile station. The F-GCH may be comprised of multiple channels. In the example embodiment, a common F-GCH channel is deployed for making common grants, and one or more individual F-GCH channels are deployed for making individual grants. Grants are made by the scheduling base station in response to one or more requests from one or more mobile stations on their respective R-REQCHs. Grant channels may be labeled as $GCH_x$, where the subscript x identifies the channel number. A channel number 0 may be used to indicate the common grant channel. If N individual channels are deployed, the subscript x may range from 1 to N.

An individual grant may be made to one or more mobile stations, each of which gives permission to the identified mobile station to transmit on the R-ESCH at a specified T/P ratio or below. Making grants on the forward link will naturally introduce overhead that uses some forward link capacity. Various options for mitigating the overhead associated with grants are detailed herein, and other options will be apparent to those of skill in the art in light of the teachings herein.

One consideration is that mobile stations will be situated such that each experiences varying channel quality. Thus, for example, a high geometry mobile station with a good forward and reverse link channel may need a relatively low power for grant signal, and is likely to be able to take advantage of a high data rate, and hence is desirable for an individual grant. A low geometry mobile station, or one experiencing deeper fading, may require significantly more power to receive an individual grant reliably. Such a mobile station may not be the best candidate for an individual grant. A common grant for this mobile station, detailed below, may be less costly in forward link overhead.

In the example embodiment, a number of individual F-GCH channels are deployed to provide the corresponding number of individual grants at a particular time. The F-GCH channels are code division multiplexed. This facilitates the ability to transmit each grant at the power level required to reach just the specific intended mobile station. In an alternative embodiment, a single individual grant channel may be deployed, with the number of individual grants time multiplexed. To vary the power of each grant on a time multiplexed individual F-GCH may introduce additional complexity. Any signaling technique for delivering common or individual grants may be deployed within the scope of the present invention.

In some embodiments, a relatively large number of individual grant channels (i.e. F-GCHs) are deployed to allow for a relatively large number of individual grants at one time. In such a case, it may be desirable to limit the number of individual grant channels each mobile station has to monitor. In one example embodiment, various subsets of the total number of individual grant channels are defined. Each mobile station is assigned a subset of individual grant channels to monitor. This allows the mobile station to reduce processing complexity, and correspondingly reduce power consumption. The tradeoff is in scheduling flexibility, since the scheduling base station may not be able to arbitrarily assign sets of individual grants (e.g., all individual grants can not be made to members of a single group, since those members, by design, do not monitor one or more of the individual grant channels). Note that this loss of flexibility does not necessarily result in a loss of capacity. For illustration, consider an example including four individual grant channels. The even numbered mobile stations may be assigned to monitor the first two grant channels, and the odd numbered mobile stations may be assigned to monitor the last two. In another example, the subsets may overlap, such as the even mobile stations monitoring the first three grant channels, and the odd mobile stations monitoring the last three grant channels. It is clear that the scheduling base station cannot arbitrarily assign four mobile stations from any one group (even or odd). These examples are illustrative only. Any number of channels with any configuration of subsets may be deployed within the scope of the present invention.

The remaining mobile stations, having made a request, but not receiving an individual grant, may be given permission to transmit on the R-ESCH using a common grant, which specifies a maximum T/P ratio that each of the remaining mobile stations must adhere to. The common F-GCH may also be referred to as the Forward Common Grant Channel (F-CGCH). A mobile station monitors the one or more individual grant channels (or a subset thereof) as well as the common F-GCH. Unless given an individual grant, the mobile station may transmit if a common grant is issued. The common grant indicates the maximum T/P ratio at which the remaining mobile stations (the common grant mobile stations) may transmit for the data with certain type of QoS.

In the example embodiment, each common grant is valid for a number of subpacket transmission intervals. Once receiving a common grant, a mobile station that has sent a request, but doesn't get an individual grant may start to transmit one or more encoder packets within the subsequent transmission intervals. The grant information may be repeated multiple times. This allows the common grant to be transmitted at a reduced power level with respect to an individual grant. Each mobile station may combine the energy from multiple transmissions to reliably decode the common grant. Therefore, a common grant may be selected for mobile stations with low-geometry, for example, where an individual grant is deemed too costly in terms of forward link capacity. However, common grants still require overhead, and various techniques for reducing this overhead are detailed below.

The F-GCH is sent by the base station to each mobile station that the base station schedules for transmission of a new R-ESCH packet. It may also be sent during a transmission or a retransmission of an encoder packet to force the mobile station to modify the T/P ratio of its transmission for the subsequent subpackets of the encoder packet in case congestion control becomes necessary.

In the example embodiment, the common grant consists of 12 bits including a 3-bit type field to specify the format of the next nine bits. The remaining bits indicate the maximum allowed T/P ratio for 3 classes of mobiles as specified in the type field, with 3 bits denoting the maximum allowable T/P ratio for each class. The mobile classes may be based on QoS requirements, or other criterion. Various other common grant formats are envisioned, and will be readily apparent to one of ordinary skill in the art.

In the example embodiment, an individual grant comprises 12 bits including: 11 bits to specify the Mobile ID and maximum allowed T/P ratio for the mobile station being granted to transmit, or to explicitly signal the mobile station to change its maximum allowed T/P ratio, including setting the maximum allowed T/P ratio to 0 (i.e., telling the mobile station not to transmit the R-ESCH). The bits specify the Mobile ID (1 of 192 values) and the maximum allowed T/P (1 of 10 values) for the specified mobile. In an alternate embodiment, 1 long-grant bit may be set for the specified mobile. When the long-grant bit is set to one, the mobile station is granted permission to transmit a relatively large fixed, predetermined number (which can be updated with signaling) of packets on that ARQ channel. If the long-grant bit is set to zero, the mobile station is granted to transmit one packet. A mobile may be told to turn off its R-ESCH transmissions with the zero T/P ratio specification, and this may be used to signal the mobile station to turn off its transmission on the R-ESCH for a single subpacket transmission of a single packet if the long-grant bit is off or for a longer period if the long-grant bit is on.

In one example embodiment, the mobile station only monitors the F-GCH(s) from the Serving base station. If the mobile station receives an F-GCH message, then the mobile station follows the rate information in the F-GCH message and ignores the rate control bits. An alternative would be for the mobile station to use the rule that if any rate control indicator from a base station other than the serving base station indicates a rate decrease (i.e., the RATE_DECREASE command, detailed below) then the mobile station will decrease its rate even if the F-GCH indicates an increase.

In an alternative embodiment, the mobile station may monitor the F-GCH from all base stations or a subset of the base stations in its Active Set. Higher layer signaling indicates to the mobile station which F-GCH(s) to monitor and how to combine them at channel assignment, through a hand-off direction message, or other messages. Note that a subset of F-GCHs from different base stations may be soft combined. The mobile station will be notified of this possibility. After the possible soft combining of the F-GCHs from different base stations, there may still be multiple F-GCHs at any one time. The mobile station may then decide its transmit rate as the lowest granted rate (or some other rule).

R-PICH

The Reverse Pilot Channel (R-PICH) is transmitted from the mobile station to the base stations in the Active Set. The power in the R-PICH may be measured at one or more base stations for use in reverse link power control. As is well known in the art, pilot signals may be used to provide amplitude and phase measurements for use in coherent demodulation. As described above, the amount of transmit power available to the mobile station (whether limited by the scheduling base station or the inherent limitations of the mobile station's power amplifier) is split among the pilot channel, traffic channel or channels, and control channels. Additional pilot power may be needed for higher data rates and modulation formats. To simplify the use of the R-PICH for power control, and to avoid some of the problems associated with instantaneous changes in required pilot power, an additional channel may be allocated for use as a supplemental or secondary pilot. Although, generally, pilot signals are transmitted using known data sequences, as disclosed herein, an information bearing signal may also be deployed for use in generating reference information for demodulation. In an example embodiment, the R-RICH is used to carry the additional pilot power desired.

R-RICH

The Reverse Rate Indicator Channel (R-RICH) is used by the mobile station to indicate the transmission format on the reverse traffic channel, R-ESCH. This channel may be alternately referred to as the Reverse Packet Data Control Channel (R-PDCCH).

The R-RICH may be transmitted whenever the mobile station is transmitting a subpacket. The R-RICH may also be transmitted with zero-rate indication when the mobile station is idle on R-ESCH. Transmission of zero-rate R-RICH frames (an R-RICH that indicates the R-ESCH is not being transmitted) helps the base station detect that the mobile station is idle, maintain reverse link power control for the mobile station, and other functions.

The beginning of an R-RICH frame is time aligned with the beginning of the current R-ESCH transmission. The frame duration of R-RICH may be identical to or shorter than that of the corresponding R-ESCH transmission. The R-RICH conveys the transmit format of the concurrent R-ESCH transmission, such as payload, subpacket ID and ARQ Instance Sequence Number (AI_SN) bit, and CRC for error detection. An example AI_SN is a bit that flips every time a new packet is transmitted on a particular ARQ, sometimes referred to as a "color bit". This may be deployed for asynchronous ARQ, in which there is no fixed timing between subpacket transmissions of a packet. The color bit may be used to prevent the receiver from combining subpacket(s) for one packet with the subpacket(s) of an adjacent packet on the same ARQ channel. The R-RICH may also carry additional information.

R-ESCH

The Enhanced Reverse Supplemental Channel (R-ESCH) is used as the reverse link traffic data channel in the example embodiments described herein. Any number of transmission rates and modulation formats may be deployed for the R-ESCH. In an example embodiment, the R-ESCH has the following properties: Physical layer retransmissions are supported. For retransmissions when the first code is a Rate1/4 code, the retransmission uses a Rate1/4 code and energy combining is used. For retransmissions when the first code is a rate greater than 1/4, incremental redundancy is used. The underlying code is a Rate 1/5 code. Alternatively, incremental redundancy could also be used for all the cases.

Hybrid Automatic-Repeat-Request (HARQ) is supported for both autonomous and scheduled users, both of which may access the R-ESCH.

Multiple ARQ-channel synchronous operation may be supported with fixed timing between the retransmissions: a fixed number of sub-packets between consecutive sub-packets of same packet may be allowed. Interlaced transmissions are allowed as well. As an example, for 5 ms frames, 4 channel ARQ could be supported with 3 subpacket delay between subpackets.

Table 1 lists example data rates for the Enhanced Reverse Supplemental Channel. A 5 ms subpacket size is described, and the accompanying channels have been designed to suit this choice. Other subpacket sizes may also be chosen, as will be readily apparent to those of skill in the art. The pilot reference level is not adjusted for these channels, i.e. the base station has the flexibility of choosing the T/P to target a given operating point. This max T/P value is signaled on the Forward Grant Channel. The mobile station may use a lower T/P if it is running out of power to transmit, letting HARQ meet the required QoS. Layer 3 signaling messages may also be transmitted over the R-ESCH, allowing the system to operate without the R-FCH and/or R-DCCH.

TABLE 1

Enhanced Reverse Supplemental Channel Parameters

| Number of Bits per Encoder Packet | Number of 5-ms Slots | Data Rate (kbps) | Data Rate/ 9.6 kbps | Code Rate | Symbol Repetition Factor Before the Interleaver | Modulation | Walsh Channels | Number of Binary Code Symbols in All the Subpackets | Effective Code Rate Including Repetition |
|---|---|---|---|---|---|---|---|---|---|
| 192 | 4 | 9.6 | 1.000 | 1/4 | 2 | BPSK on I | ++-- | 6,144 | 1/32 |
| 192 | 3 | 12.8 | 1.333 | 1/4 | 2 | BPSK on I | ++-- | 4,608 | 1/24 |
| 192 | 2 | 19.2 | 2.000 | 1/4 | 2 | BPSK on I | ++-- | 3,072 | 1/16 |
| 192 | 1 | 38.4 | 4.000 | 1/4 | 2 | BPSK on I | ++-- | 1,536 | 1/8 |
| 384 | 4 | 19.2 | 2.000 | 1/4 | 1 | BPSK on I | ++-- | 6,144 | 1/16 |
| 384 | 3 | 25.6 | 2.667 | 1/4 | 1 | BPSK on I | ++-- | 4,608 | 1/12 |
| 384 | 2 | 38.4 | 4.000 | 1/4 | 1 | BPSK on I | ++-- | 3,072 | 1/8 |
| 384 | 1 | 76.8 | 8.000 | 1/4 | 1 | BPSK on I | ++-- | 1,536 | 1/4 |
| 768 | 4 | 76.8 | 4.000 | 1/4 | 1 | QPSK | ++-- | 12,288 | 1/16 |
| 768 | 3 | 102.4 | 5.333 | 1/4 | 1 | QPSK | ++-- | 9,216 | 1/12 |
| 768 | 2 | 153.6 | 8.000 | 1/4 | 1 | QPSK | ++-- | 6,144 | 1/8 |
| 768 | 1 | 307.2 | 16.000 | 1/4 | 1 | QPSK | ++-- | 3,072 | 1/4 |
| 1,536 | 4 | 76.8 | 8.000 | 1/4 | 1 | QPSK | +- | 24,576 | 1/16 |
| 1,536 | 3 | 102.4 | 10.667 | 1/4 | 1 | QPSK | +- | 18,432 | 1/12 |
| 1,536 | 2 | 153.6 | 16.000 | 1/4 | 1 | QPSK | +- | 12,288 | 1/8 |
| 1,536 | 1 | 307.2 | 32.000 | 1/4 | 1 | QPSK | +- | 6,144 | 1/4 |
| 2,304 | 4 | 115.2 | 12.000 | 1/4 | 1 | QPSK | ++--/+- | 36,864 | 1/16 |
| 2,304 | 3 | 153.6 | 16.000 | 1/4 | 1 | QPSK | ++--/+- | 27,648 | 1/12 |
| 2,304 | 2 | 230.4 | 24.000 | 1/4 | 1 | QPSK | ++--/+- | 18,432 | 1/8 |
| 2,304 | 1 | 460.8 | 48.000 | 1/4 | 1 | QPSK | ++--/+- | 9,216 | 1/4 |
| 3,072 | 4 | 153.6 | 16.000 | 1/5 | 1 | QPSK | ++--/+- | 36,864 | 1/12 |
| 3,072 | 3 | 204.8 | 21.333 | 1/5 | 1 | QPSK | ++--/+- | 27,648 | 1/9 |
| 3,072 | 2 | 307.2 | 32.000 | 1/5 | 1 | QPSK | ++--/+- | 18,432 | 1/6 |
| 3,072 | 1 | 614.4 | 64.000 | 1/5 | 1 | QPSK | ++--/+- | 9,216 | 1/3 |
| 4,608 | 4 | 230.4 | 24.000 | 1/5 | 1 | QPSK | ++--/+- | 36,864 | 1/8 |
| 4,608 | 3 | 307.2 | 32.000 | 1/5 | 1 | QPSK | ++--/+- | 27,648 | 1/6 |
| 4,608 | 2 | 460.8 | 48.000 | 1/5 | 1 | QPSK | ++--/+- | 18,432 | 1/4 |
| 4,608 | 1 | 921.6 | 96.000 | 1/5 | 1 | QPSK | ++--/+- | 9,216 | 1/2 |
| 6,144 | 4 | 307.2 | 32.000 | 1/5 | 1 | QPSK | ++--/+- | 36,864 | 1/6 |
| 6,144 | 3 | 409.6 | 42.667 | 1/5 | 1 | QPSK | ++--/+- | 27,648 | 2/9 |
| 6,144 | 2 | 614.4 | 64.000 | 1/5 | 1 | QPSK | ++--/+- | 18,432 | 1/3 |
| 6,144 | 1 | 1228.8 | 128.000 | 1/5 | 1 | QPSK | ++--/+- | 9,216 | 2/3 |

In an example embodiment, turbo coding is used for all the rates. With R=1/4 coding, an interleaver similar to the current cdma2000 reverse link is used. With R=1/5 coding, an interleaver similar to the cdma2000 Forward Packet Data Channel is used.

The number of bits per encoder packet includes the CRC bits and 6 tail bits. For an encoder packet size of 192 bits, a 12-bit CRC is used; otherwise, a 16-bit CRC is used. The 5-ms slots are assumed to be separated by 15 ms to allow time for ACK/NAK responses. If an ACK is received, the remaining slots of the packet are not transmitted.

The 5 ms subpacket duration, and associated parameters, just described, serve as an example only. Any number of combinations of rates, formats, subpacket repetition options, subpacket duration, etc. will be readily apparent to those of skill in the art in light of the teaching herein. An alternate 10 ms embodiment, using 3 ARQ channels, could be deployed. In one embodiment, a single subpacket duration or frame size is selected. For example, either a 5 ms or 10 ms structure would be selected. In an alternate embodiment, a system may support multiple frame durations.

F-CPCCH

The Forward Common Power Control Channel (F-CPCCH) may be used to power control various reverse link channels, including the R-ESCH when the F-FCH and the F-DCCH are not present, or when the F-FCH and the F-DCCH are present but not dedicated to a user. Upon channel assignment, a mobile station is assigned a reverse link power control channel. The F-CPCCH may contain a number of power control subchannels.

The F-CPCCH may carry a power control subchannel called the Common Congestion Control subchannel (F-OLCH). The exemplary congestion control subchannel is typically at a rate of 100 bps, though other rates can be used. The single bit (which may be repeated for reliability), referred to herein as the busy bit, indicates the mobile stations in autonomous transmission mode, or in the common grant mode, or both, whether to increase or decrease their rate. In an alternate embodiment, individual grant modes may be also be sensitive to this bit. Various embodiments may be deployed with any combination of transmission types responsive to the F-OLCH. This can be done in a probabilistic manner, or deterministically.

In one embodiment, setting the busy bit to '0' indicates that mobile stations responsive to the busy bit should decrease their transmission rate. Setting the busy bit to '1' indicates a corresponding increase in transmission rate. Myriad other signaling schemes may be deployed, as will be readily apparent to those of skill in the art, and various alternate examples are detailed below.

During channel assignment, the mobile station is assigned to these special power control channels. A power control channel may control all the mobiles in the system, or alternatively, varying subsets of the mobile stations may be controlled by one or more power control channels. Note that use of this particular channel for congestion control is but one example.

F-ACKCH

The Forward Acknowledgement Channel, or F-ACKCH, is used by a base station to acknowledge the correct reception of the R-ESCH, and can also be used to extend an existing grant. An acknowledgement (ACK) on the F-ACKCH indicates correct reception of a subpacket. Additional transmission of that subpacket by the mobile station is unnecessary. A negative acknowledgement (NAK) on the F-ACKCH allows the mobile station to transmit another subpacket, limited by a maximum allowed number of subpackets per packet.

In embodiments detailed herein, the F-ACKCH is used to provide positive or negative acknowledgment of a received subpacket, as well as an indication of whether or not rate control commands will be issued (described below with respect to the F-RCCH channel).

FIG. 5 is an example embodiment illustrating a tri-valued F-ACKCH. This example F-ACKCH consists of a single indicator, transmitted from one or more base stations to a mobile station, to indicate whether or not the transmission on the R-ESCH from the mobile station has been received correctly by the respective base station. In an example embodiment, the F-ACKCH indicator is transmitted by every base station in the Active Set. Alternatively, the F-ACKCH may be transmitted by a specified subset of the Active Set. The set of base stations sending the F-ACKCH may be referred to as the F-ACKCH Active Set. The F-ACKCH Active Set may be signaled by Layer 3 (L3) signaling to the mobile station and may be specified during channel assignment, in a Handoff Direction message (HDM), or via other techniques known in the art.

For example, F-ACKCH may be a 3-state channel with the following values: NAK, ACK_RC, and ACK_STOP. A NAK indicates that the packet from the mobile station has to be retransmitted (however, if the last subpacket has been sent, the mobile station may need to resend the packet using any of the techniques available, such as request/grant, rate control, or autonomous transmission). The mobile station may need to monitor the Rate Control indicator on the corresponding F-RCCH (detailed further below) if the NAK corresponds to last subpacket of a packet.

An ACK_RC indicates that no retransmissions of the packet from the mobile station are necessary, and the mobile station should monitor the Rate Control indicator on the corresponding F-RCCH. ACK_STOP also indicates no retransmission is necessary. However, in this case, the mobile station should revert to autonomous mode for the next transmission unless the mobile station receives a grant message on the F-GCH (detailed above).

L3 signaling may indicate whether or not the mobile station is to soft-combine the F-ACKCH indicators from different base stations in its Active Set. This may be equivalent to handling the power control bits in accordance with Revision C of IS-2000. For example, there may be an indicator, say ACK_COMB_IND, sent upon channel assignment and in handoff messages that would indicate whether the mobile station is to combine the F-ACKCH indicators from different base stations. A variety of techniques may be employed for transmitting the F-ACKCH, examples of which are given below.

Some examples include a separate TDM channel, a TDM/CDM channel, or some other format.

In this example, there are two classes of results from monitoring the F-ACK channels, depending on whether the packet is acknowledged or not. If a NAK is received, a variety of options are available. The mobile station may send additional subpackets until the maximum number of subpackets has been sent. (In the example embodiment, the subpackets are sent using the same transmission format, whether initiated through autonomous or granted transmission, and whether or not subject to a rate control revision. In an alternate embodiment, the subpacket transmission format may be altered using any of the techniques disclosed herein). Subsequent to a NAK of the final subpacket, the mobile station may either take action relative to corresponding rate control commands (monitor the F-RCCH), stop transmitting according to the previous grant or rate control command (i.e. revert to autonomous transmission, if desired), or respond to a new received grant.

If an ACK is received, it may correspond to a rate control command or an indication to stop. If rate control is indicated, the rate control channel (F-RCCH) is monitored and followed. If the outcome is to stop, then the mobile station does not follow the rate control indicators on the F-RCCH and reverts to the autonomous mode (transmitting up to the assigned maximum autonomous rate). If an explicit grant is received at the same time as an ACK_STOP, then the mobile station follows the command in the explicit grant.

For example, first consider a single Active Set Member or the case when the indicators from all sectors are the same (and are so indicated by ACK_COMB_IND). In this case, there is a single resultant indicator. When the mobile station receives a NAK (indicator not transmitted), then the mobile station retransmits the next subpacket (at the appropriate time). If the mobile station does not receive an ACK for the last subpacket, then the mobile station goes on to the next packet (the errant packet may be retransmitted according to whatever retransmission algorithm is being followed). However, the mobile station takes this as a rate control indication (i.e. monitors the rate control channel).

In this example, a general rule is as follows (applicable to both a single Active Set member and multiple distinctive F-ACKCH Active Set members). If any indicator is an ACK_STOP or ACK_RC, the result is an ACK. If none of the indicators is an ACK_STOP or ACK_RC, the result is a NAK. Then, in relation to rate control, if any indicator is an ACK_STOP, the mobile station will stop (i.e. revert to autonomous mode, or respond to a grant, if any). If no indicator is an ACK_STOP and at least one indicator is an ACK_RC, decode the indicator on the rate control channel (F-RCCH) of the corresponding base station. If the last subpacket has been transmitted, and all indicators are NAK, decode the indicator on the rate control channels (F-RCCH) of all the base stations. Responding to the rate control commands in these scenarios is detailed further below with respect to the description of F-RCCH.

An ACK_RC command, combined with the rate control channel, may be thought of as a class of commands referred to as ACK-and-Continue commands. The mobile station may continue transmitting subsequent packets, continuing in accordance with the various rate control commands that may be issued (examples detailed below). An ACK-and-Continue command allows the base station to acknowledge successful reception of a packet and, at the same time, permit the mobile station to transmit using the grant that led to the successfully received packet (subject to possible revisions according to the rate control commands). This saves the overhead of a new grant.

In the embodiment of the F-ACKCH, depicted in FIG. 5, a positive value for the ACK_STOP symbol, a NULL symbol for the NAK, and a negative value for the ACK_RC symbol is used. On-off keying (i.e., not sending NAK) on the F-ACKCH allows the base stations (especially non-scheduling base stations) an option of not sending an ACK when the cost (required power) of doing so is too high. This provides the base station a trade-off between the forward link and reverse link capacity, since a correctly received packet that is not ACKed will likely trigger a re-transmission at a later point in time.

A variety of techniques for sending the F-ACKCH may be deployed within the scope of the present invention. Individual signals for each mobile station may be combined in a common channel. For example, acknowledgement responses for a plurality of mobile stations may be time multiplexed. In an example embodiment, up to 96 Mobile IDs can be supported on one F-ACKCH. Additional F-ACKCHs may be deployed to support additional Mobile IDs.

Another example is to map a plurality of acknowledgement signals for a plurality of mobile stations onto a set of orthogonal functions. A Hadamard Encoder is one example of an encoder for mapping onto a set of orthogonal functions. Various other techniques may also be deployed. For example, any Walsh Code or other similar error correcting code may be used to encode the information bits. Different users may be transmitted to at different power levels if independent each subchannel has an independent channel gain. The exemplary F-ACKCH conveys one dedicated tri-valued flag per user. Each user monitors the F-ACKCH from all base stations in its Active Set (or, alternatively, signaling may define a reduced active set to reduce complexity).

In various embodiments, two channels are each covered by a 128-chip Walsh cover sequence. One channel is transmitted on the I channel, and the other is transmitted on the Q channel. Another embodiment of the F-ACKCH uses a single 128-chip Walsh cover sequence to support up to 192 mobile stations simultaneously. An example embodiment uses a 10-ms duration for each tri-valued flag.

To review, when the mobile station has a packet to send that requires usage of the R-ESCH, it may request on the R-REQCH. The base station may respond with a grant using an F-GCH. However, this operation may be somewhat expensive. To reduce the forward link overhead, F-ACKCH may send the ACK_RC flag, which extends the existing grant (subject to rate control) at low cost by the scheduling base station (or others, when soft handoff grants from multiple base stations are supported). This method works for both individual and common grants. ACK_RC is used from the granting base station (or base stations), and extends the current grant for one more encoder packet on the same ARQ channel (subject to rate control).

Note that, as shown in FIG. 4, not every base station in the Active Set is required to send back the F-ACKCH. The set of base stations sending the F-ACKCH in soft handoff may be a subset of the Active Set. Example techniques for transmitting the F-ACKCH are disclosed in co-pending U.S. patent application Ser. No. 10/611,333, entitled "CODE DIVISION MULTIPLEXING COMMANDS ON A CODE DIVISION MULTIPLEXED CHANNEL", filed Jun. 30, 2003, assigned to the assignee of the present invention.

F-RCCH

The Forward Rate Control Channel (F-RCCH) is transmitted from one or more base stations to a mobile station to signal a rate adjustment for the next transmission. A mobile station may be assigned to monitor the indicator from every member of the F-ACKCH Active Set or a subset thereof. For clarity, the set of base stations sending the F-RCCH to be monitored by the mobile station will be referred to as the F-RCCH Active Set. The F-RCCH Active Set may be signaled by Layer 3 (L3) signaling, which may be specified during channel assignment, in a Hand-Off Direction message (HDM), or any of various other ways known to those of skill in the art.

FIG. 6 depicts an exemplary F-RCCH. The F-RCCH is a 3-state channel with the following values: RATE_HOLD, indicating the mobile station can transmit the next packet at no more than the same rate of current packet; RATE_INCREASE, indicating that the mobile station can, either deterministically or probabilistically, increase the maximum rate to transmit the next packet relative to the transmit rate of current packet; and RATE_DECREASE, indicating that the mobile station can, either deterministically or probabilistically, decrease the maximum rate to transmit the next packet relative to the transmit rate of current packet.

L3 signaling may indicate whether or not the mobile station is to combine the Rate Control indicators from different base stations. This is similar to what is done with the power control bits in IS-2000 Rev. C. Thus, there would be an indicator, for example RATE_COMB_IND, sent upon channel assignment, and in handoff messages, that would indicate whether the mobile station is to soft-combine the F-RCCH bits from different base stations. Those of skill in the art will recognize that there are many formats for transmitting channels such as the F-RCCH, including separate TDM channels, combined TDM/CDM channels, or other formats.

In various embodiments, various rate control configurations are possible. For example, all mobile stations may be controlled by a single indicator per sector. Alternatively, each mobile station may be controlled by a separate indicator per sector dedicated to each mobile station. Or, groups of mobile stations may be controlled by their own assigned indicator. Such a configuration allows mobile stations with the same maximum QoS grade to be assigned the same indicator. For example, all mobile stations whose only stream is designated "best effort" may be controlled by one assigned indicator, thus allowing a reduction in load for these best effort streams.

In addition, signaling may be used to configure a mobile station so that the mobile station only pays attention to the F-RCCH indicator from the Serving Base Station or from all base stations in the F-RCCH Active Set. Note that if the mobile station is only monitoring the indicator from the Serving Base Station and RATE_COMB_IND specifies that the indicator is the same from multiple base stations, then the mobile station may combine all indicators in the same group as the Serving Base Station before making a decision. The set of base stations with distinctive rate control indicators in use at any time will be referred to as the F-RCCH Current Set. Thus, if the mobile station is configured so that the mobile station only pays attention to the F-RCCH indicator from the Serving Base Station, then the size of the F-RCCH Current Set is 1.

It is envisioned that the usage rules for the F-RCCH may be adjusted by the base station. The following is an example set of rules for a mobile station with a single-member F-RCCH Current Set. If a RATE_HOLD is received, the mobile station does not change its rate. If a RATE_INCREASE is received, the mobile station increases its rate by one (i.e. one rate level, examples of which are detailed above in Table 1). If a RATE_DECREASE is received, the mobile station decreases its rate by one. Note that the mobile station monitors these indicators only when circumstances dictate (i.e. the action as a result of the ACK process, detailed further below, indicating rate control is active).

The following is an example set of rules for a mobile station with multiple F-RCCH Current Set members. The simple rule of increasing/decreasing the rate by 1 rate is modified. If any ACK_STOP is received, the mobile station reverts to autonomous rates. Otherwise, if any indicator is a RATE_DECREASE, the mobile station decreases its rate by one. If no indicator is a RATE_DECREASE, and at least one base station has an action of rate control (as a result of the ACK process) that indicates RATE_HOLD, then the mobile station maintains the same rate. If no indicator is a RATE_DECREASE, no base station indicates rate control and RATE_HOLD, and at least one base station has an action of rate control and an indication of RATE_INCREASE; then the mobile station increases its rate by one.

Example Combined Grant, ARQ, and Rate Control Command Embodiments

To summarize some of the aspects introduced above, mobile stations may be authorized to make autonomous transmissions, which, while perhaps limited in throughput, allow for low delay. In such a case, the mobile station may transmit without request up to a max R-ESCH T/P ratio, $T/P_{Max\_auto}$, which may be set and adjusted by the base station through signaling.

Scheduling may be determined at one or more scheduling base stations, and allocations of reverse link capacity may be made through grants transmitted on the F-GCH at a relatively high rate. Additionally, rate control commands may be used to modify previously granted transmissions or autonomous transmissions, with low overhead, thus tuning the allocation of reverse link capacity. Scheduling may thus be employed to tightly control the reverse link load and thus protect voice quality (R-FCH), DV feedback (R-CQICH) and DV acknowledgement (R-ACKCH).

An individual grant allows detailed control of a mobile station's transmission. Mobile stations may be selected based upon geometry and QoS to maximize throughput while maintaining required service levels. A common grant allows efficient notification, especially for low geometry mobile stations.

The F-ACKCH channel in combination with the F-RCCH channel effectively implements "ACK-and-Continue" commands, which extend existing grants at low cost. (The continuation may be rate controlled, as described above, and detailed further below). This works with both individual grants and common grants. Various embodiments and techniques for scheduling, granting, and transmitting on a shared resource, such as a 1xEV-DV reverse link, are disclosed in co-pending U.S. patent application Ser. No. 10/646,955, entitled "SCHEDULED AND AUTONOMOUS TRANSMISSION AND ACKNOWLEDGEMENT", filed Aug. 21, 2003, assigned to the assignee of the present invention, and incorporated by reference herein.

Figure 7:
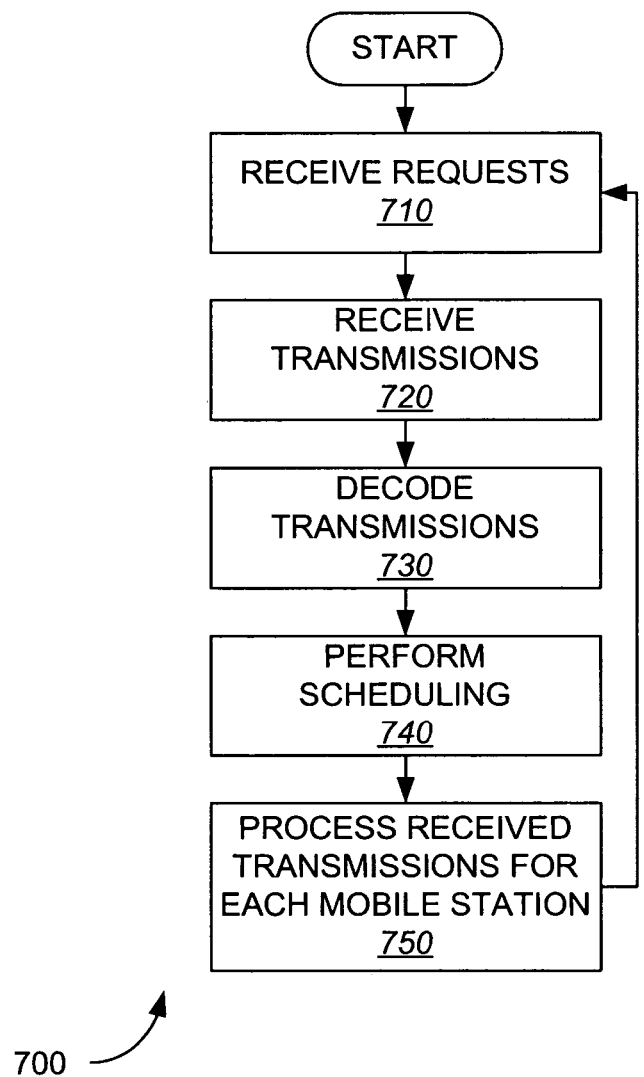
FIG. 7 is an example method deployable in a base station to allocate capacity in response to requests and transmissions from one or more mobile stations.

FIG. 7 depicts example method 700 that one or more base stations may deploy to allocate capacity in response to requests and transmissions from one or more mobile stations. Note that the order of blocks shown is but one example, and the order of the various blocks may be interchanged or combined with other blocks, not shown, without departing from the scope of the present invention. The process starts at block 710. The base station receives any requests for transmission that may be transmitted by one or more mobile stations. As method 700 may be iterated indefinitely, there may be prior requests also received that may not have been granted, which may be combined with new requests to estimate the amount of demand for transmission according to requests.

In block 720, one or more mobile stations may transmit subpackets that are received by the base station. These transmitted subpackets may have been transmitted in accordance with previous grants (potentially modified with previous rate control commands) or autonomously (also potentially modified with previous rate control commands). The number of autonomous transmissions, the number of registered mobile stations, and/or other factors may be used to estimate the amount of demand for autonomous transmission.

In block 730, the base station decodes any received subpackets, optionally soft-combining with respective previously received subpackets, to determine whether the packets have been received without error. These decisions will be used to send a positive or negative acknowledgement to the respective transmitting mobile stations. Recall that HARQ may be used for packet transmission on the R-ESCH. That is, a packet may be transmitted up to certain number of times until it is received correctly by at least one base station. At each frame boundary, each base station decodes the R-RICH frame and determines the transmit format on the R-ESCH. A base station may also make this determination using the current R-RICH frame and previous R-RICH frames. Alternatively, a base station may also make the determination using other information extracted from a Reverse Secondary Pilot Channel (R-SPICH) and/or the R-ESCH. With the determined transmit format, the base station attempts to decode the packet on the R-ESCH, using previously received subpackets, as appropriate.

In block 740, the base station performs scheduling. Any scheduling technique may be deployed. The base station may factor in demand for transmission according to requests, anticipated autonomous transmission, estimates of current channel conditions, and/or various other parameters in order to perform scheduling to allocate the shared resource (reverse link capacity, in this example). Scheduling may take various forms for the various mobile stations. Examples include making a grant (allocating according to a request, increasing a previous grant or reducing a previous grant), generating a rate control command to increase, decrease, or hold a previously granted rate or autonomous transmission, or ignoring a request (relegating the mobile station to autonomous transmission).

Figure 8:
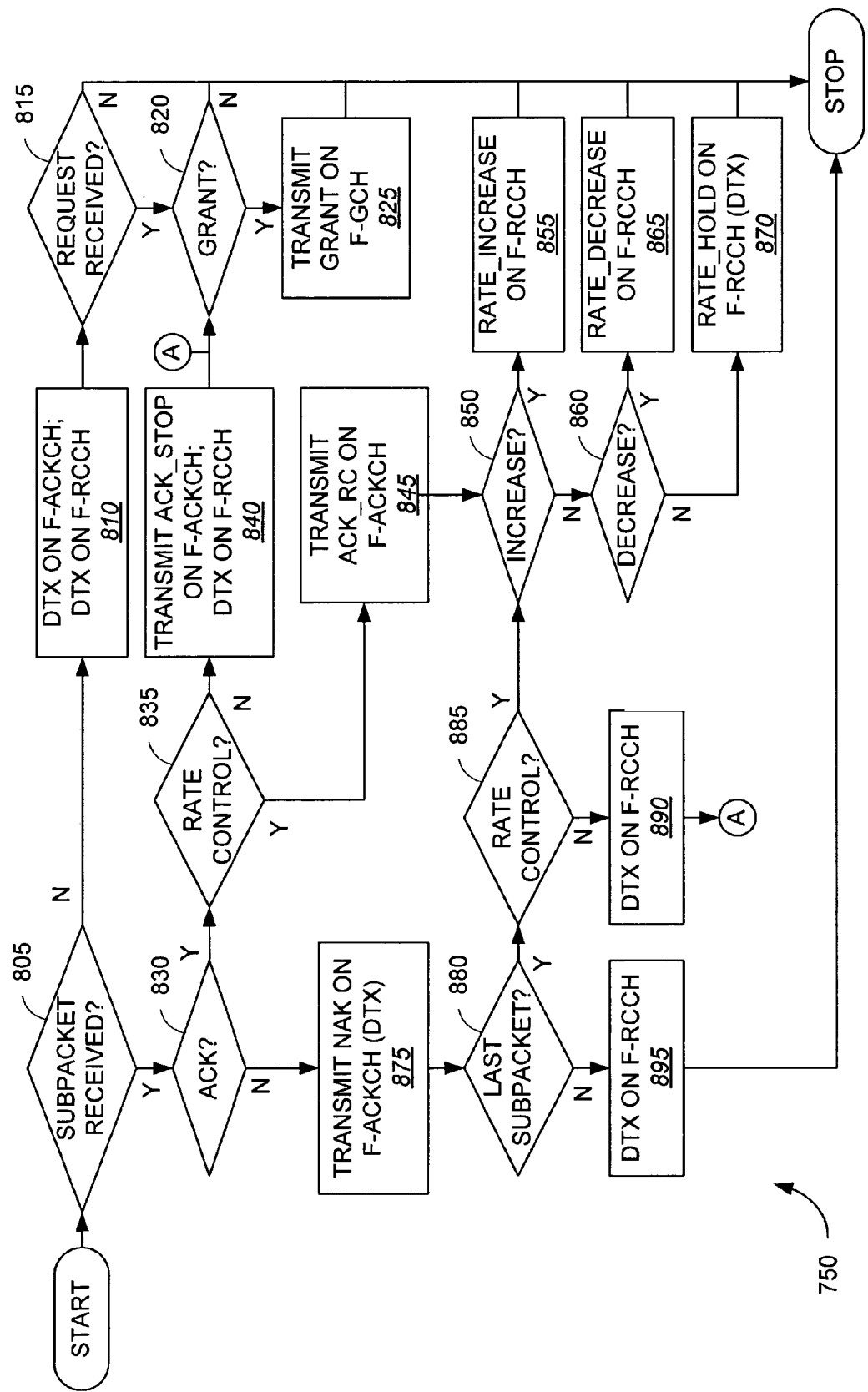
FIG. 8 is an example method of generating grants, acknowledgements, and rate control commands.

In step 750, the base station processes the received transmissions for each mobile station. This may include, among other functions, acknowledging received subpackets, and conditionally generating grants in response to requests for transmission. FIG. 8 depicts example method 750 of generating grants, acknowledgements, and rate control commands. It is suitable for deployment in the example method 700 depicted in FIG. 7, and may be adapted for use with other methods, as will be readily apparent to those of ordinary skill in the art. Method 750 may be iterated for each active mobile station during each pass through method 700, as described above.

In decision block 805, if a subpacket for the mobile station currently being processed has not been received, proceed to block 810. There is no acknowledgement necessary, and no rate control command to issue. Neither the F-ACKCH nor the F-RCCH need to be transmitted, and both symbols may be DTXed (not transmitted). In decision block 815, if a request has been received, proceed to decision block 820. Otherwise the process may stop.

In decision block 820, if a grant has been determined for this mobile station during scheduling, proceed to block 825 to transmit the grant on the appropriate F-GCH. Then the process may stop. The mobile station may transmit in accordance with this grant during the next appropriate frame (timing examples are detailed below with respect to FIGS. 10-12).

Returning to decision block 805, if a subpacket from the mobile station was received, proceed to decision block 830. (Note that it is possible for a subpacket and a request to be received, in which case both branches out of decision block 805 may be performed for a mobile station, details not shown for clarity of discussion).

In decision block 830, if the received subpacket was decoded correctly, an ACK will be generated. Proceed to decision block 835. If rate control is desired (including a rate hold, i.e. "Continue"), proceed to block 845. If no rate control is desired, proceed to block 840. In block 840, an ACK_STOP is transmitted on F-ACKCH. F-RCCH need not be transmitted, i.e. a DTX may be generated. If no grant is generated at this time, the mobile station will be relegated to autonomous transmission (or must stop, if autonomous transmission is not available, or not deployed). Alternatively, a new grant may be issued which will override the stop command. Proceed to decision block 820 to process this decision, as described above.

In block 845, rate control was indicated. As such, an ACK_RC will be transmitted on F-ACKCH. Proceed to decision block 850. If an increase is desired, transmit a RATE_INCREASE on F-RCCH. Then the process may stop. If an increase is not desired, proceed to decision block 860. In decision block 860, if a decrease is desired, transmit a RATE_DECREASE on F-RCCH. Then the process may stop. Otherwise, transmit a RATE_HOLD on F-RCCH. In this example, a hold is indicated by a DTX. Then the process may stop.

Returning to decision block 830, if the received subpacket was not decoded correctly, a NAK will be generated. Proceed to block 875 to transmit a NAK on F-ACKCH. In this example, a NAK is indicated by a DTX. Proceed to decision block 880 to determine if the received subpacket was the last subpacket (i.e. the maximum number of subpacket retransmissions has been reached). If not, in this example, the mobile station may retransmit according to the previous transmission format. A DTX may be transmitted on F-RCCH, as indicated in block 895. (Alternative embodiments may perform alternate signaling in this case, examples of which are described below.) Then the process may stop.

If the received, and NAKed, subpacket is the last subpacket, proceed from decision block 880 to decision block 885 to determine if rate control (including a hold) is desired. This is an example technique for extending the previous grant or autonomous transmission (including previous rate control, if any), with low overhead. If no rate control is desired, a DTX is generated for the F-RCCH. In this example, the mobile station will transmit the next subpacket. Similar to decision block 835, if a new grant is not generated for the mobile station, the mobile station will be relegated to autonomous transmission (if available). Alternatively, a new grant may be generated, which will dictate the available transmission for the mobile station. Proceed to decision block 820 to perform this determination, as described above.

In decision block 885, if rate control is desired, proceed to decision block 850. An increase, decrease, or hold may be generated for transmission on F-RCCH, as described above. Then the process may stop.

In summary, if a packet is received correctly, the base station may send positive acknowledgement and conditionally may send a rate control message to the mobile station.

The base station may send an ACK_STOP (on F-ACKCH) to signal that the packet has been delivered and the mobile station reverts to autonomous mode for the next transmission. The base station may also send a new grant, if desired. The mobile station may transmit up to the granted rate for the next transmission. In either case, F-RCCH is DTXed. In one embodiment, only a serving (or granting) base station may generate grants. In an alternate embodiment, one or more base stations may generate grants (details for handling this option are detailed below).

The base station may send ACK_RC (on F-ACKCH) and RATE_HOLD (on F-RCCH) to signal that the packet was delivered and that the maximum rate the mobile station may transmit the next packet is same as the transmit rate of the current packet.

The base station may send ACK_RC (on F-ACKCH) and RATE_INCREASE (on F-RCCH) to signal that the packet was delivered and that mobile station may increase the maximum rate for the next packet transmission relative to the transmit rate of the current packet. The mobile station may increase the rate following certain rules known to both base station and the mobile station. The increase may be either deterministic or probabilistic. Those of skill in the art will recognize myriad rules for increasing a rate.

The base station may send ACK_RC (on F-ACKCH) and RATE_DECREASE (on F-RCCH) to signal that the packet was delivered and that the mobile station should decrease the maximum rate for the next packet transmission relative to the transmit rate of the current packet. The mobile station may decrease the rate following certain rules known to both the base station and the mobile station. The decrease may be either deterministic or probabilistic. Those of skill in the art will recognize myriad rules for decreasing a rate.

If a packet is not received successfully by the base station, and the packet may be further retransmitted (i.e., not the last subpacket), the base station sends a NAK on F-ACKCH. Note that F-RCCH is DTXed in this example.

If further retransmission is not allowed for the packet (i.e., last subpacket), the following are possible actions the base station may take. The base station may send NAK (on F-ACKCH) and a grant message simultaneously on the F-GCH to signal the mobile station that the packet was not delivered and that the mobile station may transmit up to the granted rate for the next transmission. F-RCCH is DTXed in this case. In one embodiment, only a serving (or granting) base station may generate grants. In an alternate embodiment, one or more base stations may generate grants (details for handling this option are detailed below).

The base station may also send a NAK (on F-ACKCH) and RATE_HOLD (on F-RCCH) to signal that the packet was not delivered and that the maximum rate the mobile station may transmit the next packet is the same as the transmit rate of the current packet.

The base station may also send a NAK (on F-ACKCH) and RATE_INCREASE (on F-RCCH) to signal that the packet was not delivered and that the mobile station may increase the maximum rate for next packet transmission relative to the transmit rate of the current packet. The mobile station may increase the rate following certain rules known to both the base station and the mobile station. The increase can be either deterministic or probabilistic.

The base station may also send a NAK (on F-ACKCH) and RATE_DECREASE (on F-RCCH) to signal that the packet was not delivered and that the mobile station should decrease the maximum rate for the next packet transmission relative to the transmit rate of the current packet. The mobile station may decrease the rate following certain rules known to both the base station and the mobile station. The decrease may be either deterministic or probabilistic.

In an alternative embodiment (details not shown in FIG. 8), an alternative for NAK and stop may be created. For example, in the above scenario, a DTX on F-RCCH corresponding to a NAK cannot be distinguished from a "NAK-and-hold". If it is desired to have a command to force a stop (or reversion to autonomous transmission), the base station could also use NAK and rate control, prior to the last subpacket, to indicate that a rate hold (or increase, or decrease) on the final subpacket is to mean stop. For example, any one of the rate control commands (i.e. RATE_INCREASE, RATE_DECREASE, or RATE_HOLD) may be assigned to mean stop in this special case. The mobile station will know when the last subpacket was transmitted, and can then parse the rate control commands accordingly. When the base station knows that if the final subpacket transmission should be followed by a stop in the event of a NAK, the selected rate control command may be issued with a NAK of a previous subpacket. A mobile station receiving the identified rate control command along with a NAK of a subpacket (not the final) would know that a NAK (and RATE_HOLD, for example) on the final subpacket would mean that any previous grant would be rescinded, and the mobile station must revert to autonomous transmission. The rate control commands not used for this purpose (i.e. RATE_INCREASE or RATE_DECREASE) transmitted with a final subpacket NAK would still be available. An alternative would be to transmit a grant with a zero (or lowered) rate along with the final NAK, although this would require additional overhead. Those of skill in the art will readily tradeoff these alternatives in accordance with the likelihood of "NAK-and-Stop" with other possibilities. The required overhead may then be optimized based on the probabilities of the various events.

Figure 9:
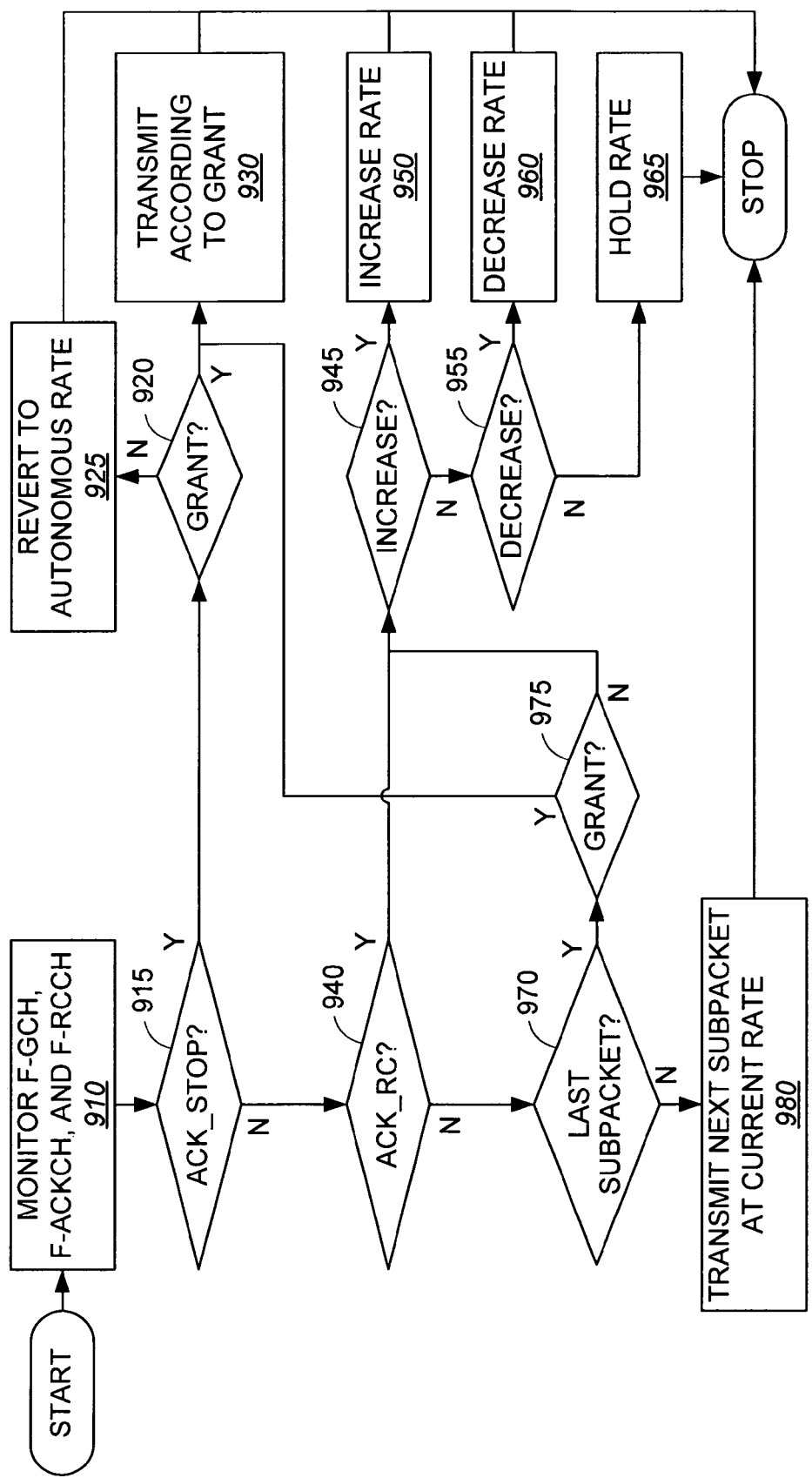
FIG. 9 is an example method for a mobile station to monitor and respond to grants, acknowledgements, and rate control commands.

FIG. 9 depicts example method 900 for a mobile station to monitor and respond to grants, acknowledgements, and rate control commands. This method is suitable for deployment in one or more mobile stations for use in conjunction with one or more base stations employing method 700, as described above, as well as other base station embodiments.

The process begins in block 910. The mobile station monitors the F-GCH, F-ACKCH, and F-RCCH. Note that in various embodiments, as described above, a mobile station may monitor one or more of these channels. For example, there may be multiple grant channels, and each mobile station may monitor one or more of them. Note also that each of these channels may be received from one base station, or more than one when the mobile station is in soft handoff. A channel may incorporate messages or commands directed to multiple mobile stations, and so a mobile station may extract the messages or commands specifically directed to it.

Other rules may be employed to allow a mobile station to conditionally monitor one or more of the control channels. For example, as described above, the F-RCCH may not be transmitted when an ACK_STOP is issued. Thus, in such a case, the mobile station need not monitor the F-RCCH when an ACK_STOP is received. A rule may be specified that a mobile station looks for grant messages and/or rate control commands only if the mobile station has sent a request to which those messages may be responsive.

In the following description of FIG. 9, it is assumed that the mobile station has previously transmitted a subpacket, for which an acknowledgement (including potential grants or rate control commands) response is expected. If a request has not been previously granted, the mobile station may still monitor for a grant in response to a previously transmitted request. Those of skill in the art will readily adapt method 900 to account for this situation. These, and other potential mobile station processing blocks, have been omitted for clarity of discussion.

Beginning in decision block 915, the processing of the F-ACKCH begins. The mobile station extracts the information on all the F-ACKCH channels it monitors. Recall that there may be an F-ACKCH between the mobile station and every member of its F-ACKCH Active Set. Some of the F-ACKCH commands may be soft-combined, as specified via L3 signaling. If a mobile station receives at least one positive acknowledgement, either ACK_RC or ACK_STOP (on F-ACKCH), the current packet has been received correctly, and additional subpackets need not be transmitted. The allowable rate for transmission of the next packet, if any, needs to be determined.

In decision block 915, if an ACK_STOP has been received, the mobile station knows that the previously transmitted subpacket has been received correctly, and that rate control commands need not be decoded.

In decision block 920, the mobile station determines if a grant has been received on an F-GCH. If so, the mobile station transmits the next packet according to the grant, as indicated in block 930. In one embodiment, only one granting base station makes grants. If ACK_STOP and a grant message are received from the base station, the mobile station transmits a new packet on the same ARQ channel at any rate equal to or below the granted rate.

In an alternate embodiment, more than one base station may send a grant. If the base stations coordinate the grant, and send an identical message, the mobile station may soft combine those grants. Various rules may be deployed to handle the cases when differing grants are received. One example is to have the mobile station transmit at the lowest rate indicated in a received grant, to avoid excessive interference in the cell corresponding to the respective granting base station (including an ACK_STOP without a corresponding grant—indicating that transmission should revert to autonomous mode). Various other alternatives will be apparent to those of skill in the art. If a grant was not received in decision block 920, the mobile station must return to autonomous rate, as shown in block 925. Then the process may stop.

Returning to decision block 915, if an ACK_STOP is not received, proceed to decision block 940. If an ACK_RC is received, the mobile station monitors the corresponding F-RCCH of base stations from which positive acknowledgement(s) are received, if any. Note that there may not be an F-RCCH between a base station and the mobile station, as the F-RCCH Active Set is a subset of the F-ACKCH Active Set. Note again that when a mobile station receives an F-ACKCH from multiple base stations, the corresponding messages may be in conflict. For example, one or more ACK_STOP commands may be received, one or more ACK_RC commands may be received, one or more grants may be received, or any combination thereof. Those of skill in the art will recognize various rules for implementing to accommodate any of the possibilities. For example, the mobile station may determine the lowest possible transmission permission (which may be from either an ACK_STOP with no grant, an ACK_RC with a decrease, or a grant with a lower value) and transmit accordingly. This is similar to a technique known as an "OR-of-Downs" rule. Such a technique may be used to strictly avoid excessive interference with neighbor cells. Or, one or more base stations may have a priority assigned with them, such that one or more base station may have the ability to trump others (with conditions attached, perhaps). For example, a scheduling (or granting) base station may have some priority over other base stations in soft handoff. Other rules are also anticipated. (Recall that one or more NAKs may also be received, but the mobile station need not retransmit. However, a mobile station may incorporate rate control commands or grants, in similar fashion, from a NAKing base station, if desired.) To facilitate the discussion herein, when it is said that a mobile station determines whether an ACK_STOP, ACK_RC, NAK, or grant is received, it may be the result of applying a desired set of rules to a number of commands received, and the outcome is the command identified.

If an ACK_RC has been received, proceed to decision block 945 to begin determining what type of rate control command should be followed. If an increase is indicated, proceed to block 950. The next transmission may be transmitted on the same ARQ channel at an increased rate from the current rate. Then the process may stop. Again, the increase may be deterministic or probabilistic. Also, a RATE_INCREASE may not necessarily result in immediate rate increase but would increase the transmission rate from the mobile station in the future (i.e., a credit-like algorithm is used at the mobile station), or a RATE_INCREASE may result in an increase spanning multiple rates. In an example credit algorithm, a mobile station maintains an internal "balance/credit" parameter. Whenever it receives RATE_INCREASE but can't increase its rate (because it is either running out of power or data), the mobile station increases the parameter. When power or data becomes available for the mobile station, it may use the stored "credit/balance" in selecting data rates. Various ways of increasing the rate will be apparent to those of skill in the art.

If an increase is not indicated in decision block 945, proceed to decision block 955 to determine if a decrease is indicated. If a decrease is indicated, proceed to block 960. The next transmission may be transmitted on the same ARQ channel at a decreased rate from the current rate. Then the process may stop. Again, the decrease may be deterministic or probabilistic. Also, a RATE_DECREASE may not necessarily result in immediate rate decrease but would decrease the transmission rate from the mobile station in the future (i.e., a credit-like algorithm is used at the mobile station), or a RATE_DECREASE may result in a decrease spanning multiple rates. When an example credit algorithm is used in the RATE_DECREASE context, when a mobile station gets a RATE_DECREASE but doesn't follow it for some reason (e.g. urgent data that needs to be sent out), it gets a negative credit, and this negative credit needs to be paid back later on, in a sense. Various ways of decreasing the rate will be apparent to those of skill in the art.

If neither an increase nor decrease is indicated, a RATE_HOLD has been received. The mobile station may transmit the next packet at a maximum rate equal to the rate of the current packet, as indicated in block 965. Then the process may stop.

Returning to decision block 940, if neither type of ACK has been identified, a NAK will be determined to have been received. In decision block 970, if retransmission is still possible for the packet (i.e., the current subpacket was not the last subpacket), the mobile station retransmits the subpacket on the same ARQ channel with the subpacket ID incremented, as depicted in block 980.

In decision block 970, if the current packet was the last subpacket, the mobile station has run out of retransmissions for the packet. Proceed to decision block 975 to determine if a grant has been received (in similar fashion as described above with respect to block 920). If a grant message is designated to the mobile station (whether from a single base station, or more than one, as discussed above), the mobile station may transmit a new packet on the same ARQ channel at a rate equal to or below the granted rate. Proceed to block 930, described above.

In decision block 975, if a grant has not been received, the mobile station may monitor the F-RCCH Active Set, obtain rate control commands, and decide the maximum rate allowed for next packet transmission on the same ARQ channel. The selection of rates when more than one rate control command is received may be made as described above. Proceed to decision block 945 and continue as described above.

Various other techniques may be employed by an exemplary embodiment of a mobile station. A mobile station may monitor the number of packet erasures (i.e., no positive acknowledgement after the last subpacket). A measurement may be made by counting the number of consecutive packet erasures or counting the number of erased packets within a window (i.e. a sliding window). If the mobile station recognizes too many packets have been erased, it may reduce its transmit rate even if the rate control commands indicate another command (i.e. RATE_HOLD or RATE_IN-CREASE).

In one embodiment, a grant message may have higher priority than a rate control bit. Alternatively, a grant message may be treated with the same priority as a rate control bit. In such a case, rate determination may be modified. For example, if no grant message is designated to the mobile station, the rate for next transmission is determined from all rate control commands (RATE$_{13}$ INCREASE, RATE_HOLD, RATE_DECREASE, and ACK_STOP) using an "OR-of-DOWN" or similar rule. When a grant is also received, a rate for next transmission may determined from all rate control commands (RATE_INCREASE, RATE_HOLD, RATE_DECREASE, and ACK_STOP) using an "OR-of-DOWN" or similar rule, the result of which is compared with a granted rate and the smaller rate chosen.

Signaling may be deployed to configure the mobile station so that the mobile station only monitors the F-RCCH indicator from either the serving base station or from all base stations in the F-RCCH Active Set. For example, when RATE_COMB_IND may specify that a rate control command is the same from multiple base stations, then the mobile station may combine all indicators in the identified group before making a decision. The number of distinctive indicators in use at any time may be indicated as the F-RCCH Current Set. In one example, a mobile station may be configured to monitor only the F-RCCH indicator from the Serving base station, in which case the size of the F-RCCH Current Set is 1.

In addition, as described above, various rules may be deployed for adjusting rates in response to commands on the F-RCCH. Any of these rules may be adjusted by signaling from the base station. In one example, there may be a set of probabilities and step sizes used in determining whether the mobile station increases or decreases its rate, and by how much. These probabilities and possible rate step sizes may be updated through signaling, as necessary.

Method 900 may be adapted to include the various alternatives described for a base station employing method 750, described above. For example, in one embodiment, a NAK and stop command is not explicitly defined, as a DTX on the F-RCCH along with a NAK indicates a rate hold. In an alternate embodiment, NAK and stop functionality may be deployed responding to any of the alternate techniques described above for method 750. Also, as noted above with respect to method 750, in the example embodiment, rate control or grant based change of rate is carried out on packet boundaries. It is anticipated that the methods described may be modified to incorporate inter-subpacket rate changes as well.

It will clear to those of skill in the art in light of the teaching herein that any of the procedures and features described herein may be combined in various ways. For example, a mobile station may only be controlled by the primary base station via grants but not controlled by other base stations via rate control bits. Alternatively, the mobile station may be controlled via grants from all the base stations, or a subset of base stations in its Active Set. Some F-GCHs may be soft combined. The mode in which a mobile station operates may be set up via L3 signaling during channel assignment or via other messages during a packet data call.

As another example, if a packet is received correctly, the primary base station may send either ACK_STOP or ACK_RC. The rate control commands may not be used, thus ACK_RC may be used to mean "ACK and continue" for this mode. In this context "ACK and continue" indicates that the mobile station may transmit a new packet at the same rate as the packet that is being acknowledged. As before, if ACK_STOP is sent, the base station may also send an overriding grant on F-GCH designated to the MS. In this example, a NAK will indicate "NAK and stop", unless a corresponding grant is transmitted with the NAK. In this scenario, non-primary base stations also send ACK_STOP or ACK_RC, where ACK_RC is not accompanied by a rate control command, and indicates "ACK and continue".

In another example special mode, incorporating a subset of the features described, the mobile station may be controlled via rate control bits only (from base stations in its F-RCCH Active Set). This mode may be set up via L3 signaling during channel assignment or other messages during a packet data call. In this mode, a base station sends NAK if a packet is not received successfully. When a packet is received correctly, a base station sends either ACK_STOP or ACK_RC along with the F-RCCH (RATE_HOLD, RATE_INCREASE, or RATE_DECREASE). A NAK after the last subpacket may be accompanied with the F-RCCH (RATE_HOLD, RATE_INCREASE, or RATE_DECREASE).

Figure 10:
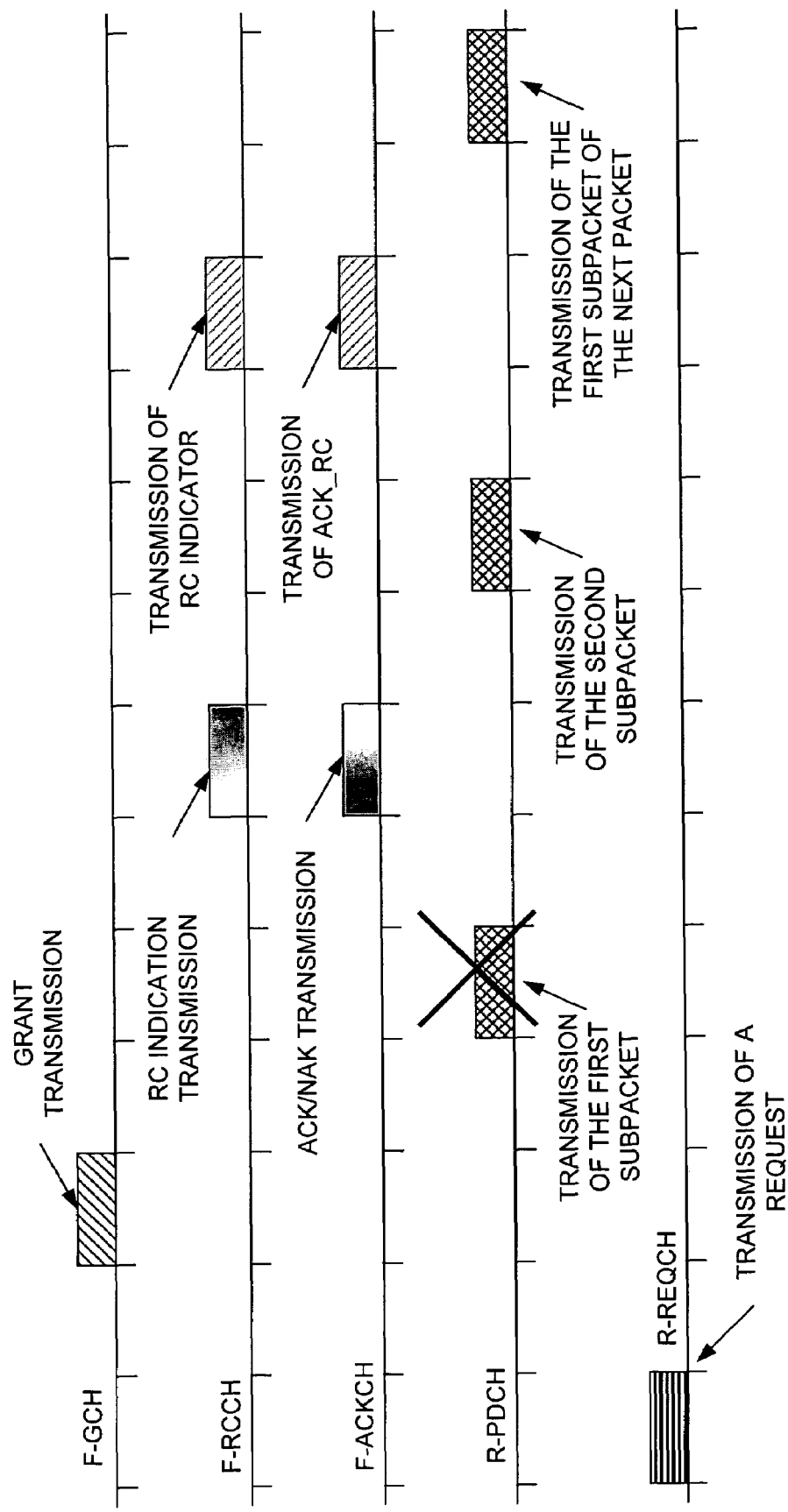
FIG. 10 depicts timing for an example embodiment with combined acknowledgement and rate control channels.
Figure 11:
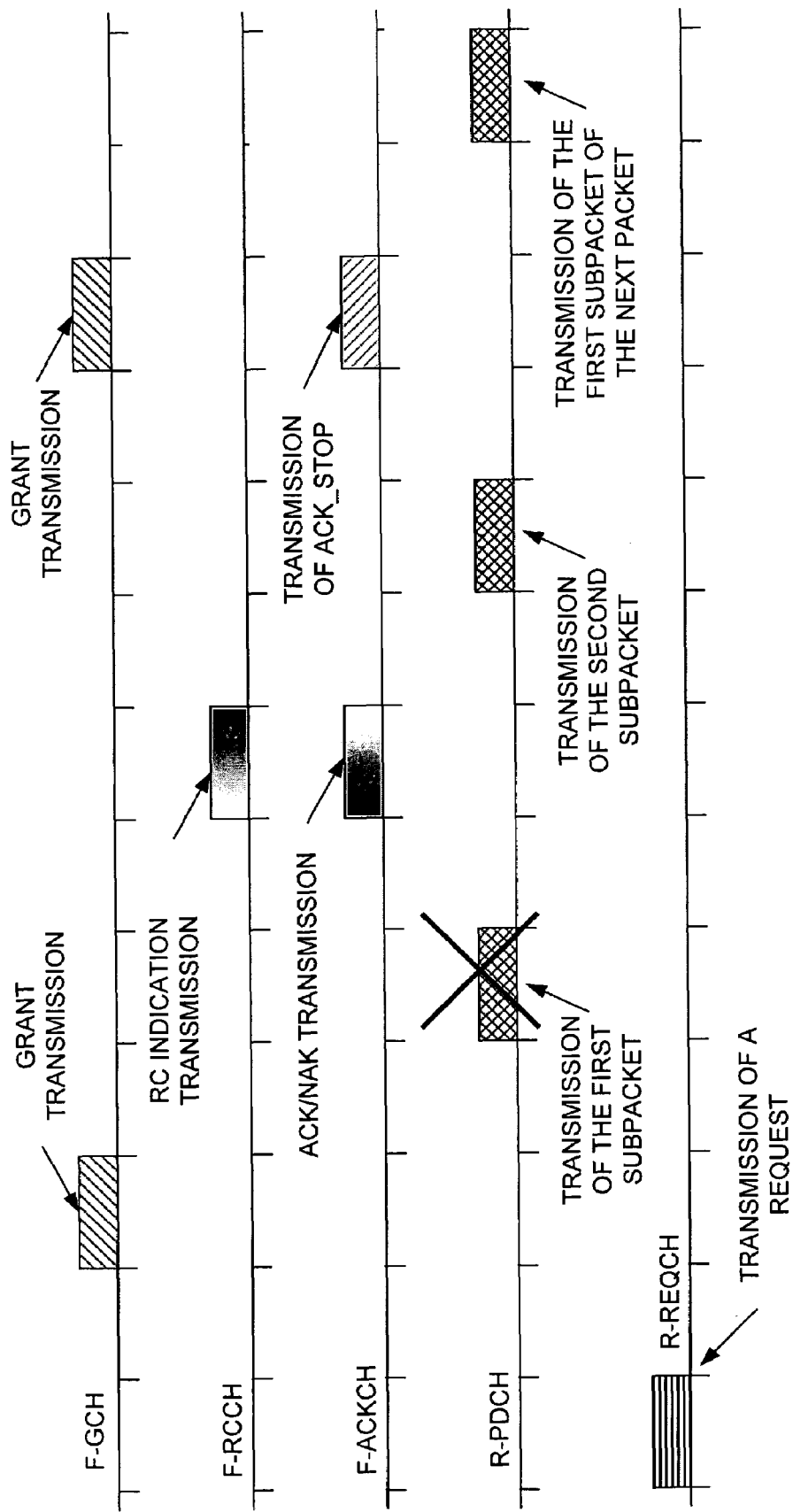
FIG. 11 depicts timing for an example embodiment with combined acknowledgement and rate control channels, along with a new grant.
Figure 12:
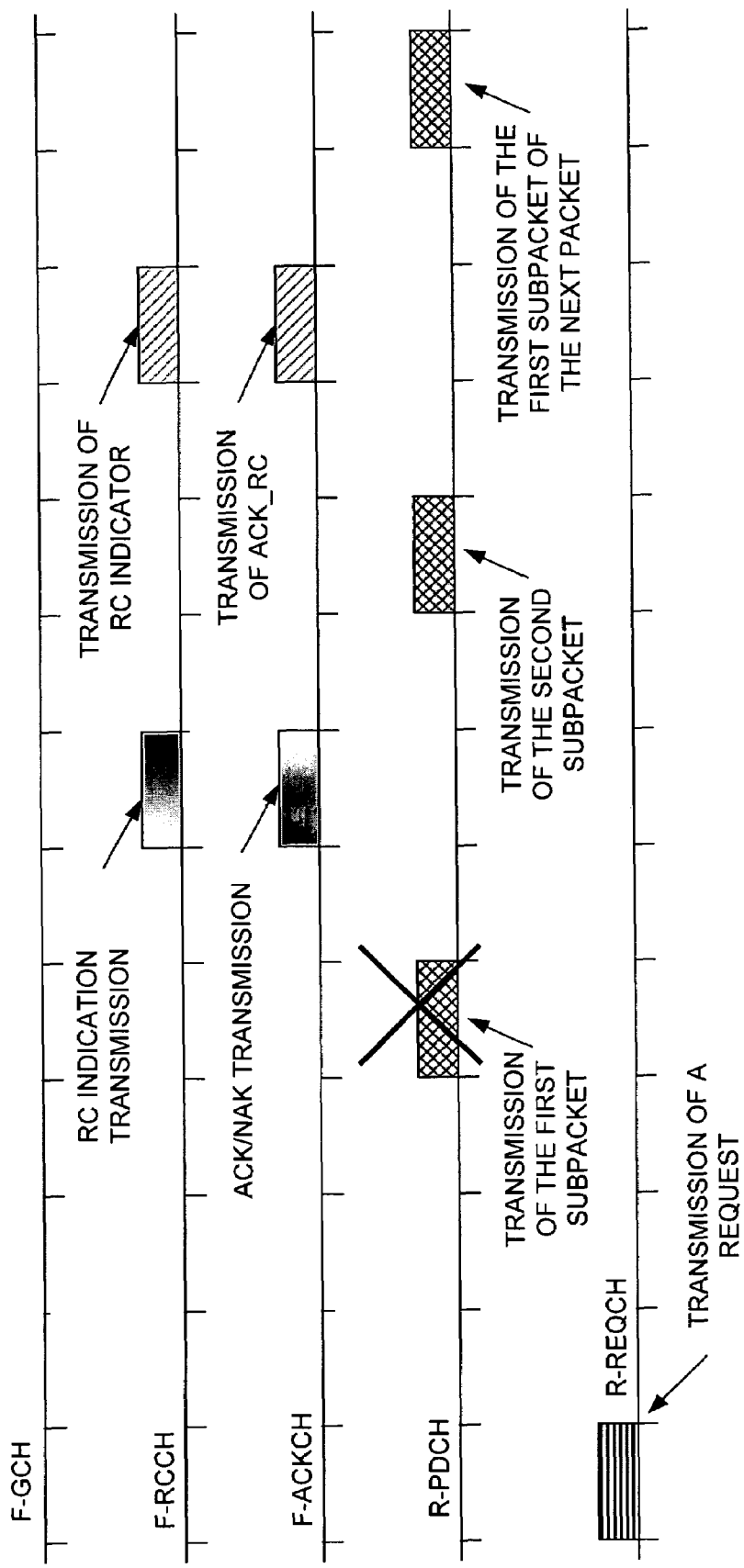
FIG. 12 depicts timing for an example embodiment with combined acknowledgement and rate control channels, without a grant.

FIGS. 10-12 show examples illustrating timing of various channels described herein. The examples do not represent any specific choice of frame length, but illustrate relative timing of the grant, ACK, and rate control (RC) indicators. The ACK indicator, RC indicator, and the grant occur during the same time interval such that the mobile station receives the ACK, RC and grant information at roughly the same time for application to the next packet transmission. In these examples, the mobile station need not monitor the RC indicators except when it receives an acknowledgement or when all subpackets have been transmitted (as described in example embodiments above). A mobile station monitors the ACK bit assigned to it and to the RC indicator corresponding to the particular ARQ sequence. For example, if there are four ARQ sequences, and the mobile station is transmitting on all ARQ sequences, then the mobile station monitors the ACK indicator every frame and to the RC indicator (as applicable) every frame. Empty frames between various transmissions are introduced to allow time for a base station or mobile station, as applicable, to receive and decode requests, subpacket transmissions, grants, acknowledgements, and rate control commands.

Note that these timing diagrams are not exhaustive, but serve only to illustrate various aspects described above. Those of skill in the art will recognize myriad combinations of sequences.

FIG. 10 depicts timing for an example embodiment with combined acknowledgement and rate control channels. A mobile station transmits a request for transmission on the R-REQCH. A base station subsequently transmits a grant on the F-GCH in response to the request. The mobile station then transmits a first subpacket using parameters in accordance with the grant. The subpacket is not decoded correctly at a base station, as indicated by the strikeout of the subpacket transmission. The base station transmits an ACK/NAK transmission on the F-ACKCH along with a rate control command on the F-RCCH. In this example, a NAK is transmitted, and the F-RCCH is DTXed. The mobile station receives the NAK and retransmits the second subpacket in response. This time, the base station correctly decodes the second subpacket, and again sends an ACK/NAK transmission on the F-ACKCH along with a rate control command on the F-RCCH. In this example, no additional grant is transmitted. An ACK_RC is transmitted, and a rate control command is issued (it may indicate an increase, decrease, or hold, as determined according to the desired scheduling). The mobile station then transmits the first subpacket of the next packet, using parameters associated with the grant, modified as necessary by the rate control command on the F-RCCH.

FIG. 11 depicts timing for an example embodiment with combined acknowledgement and rate control channels, along with a new grant. A request, grant, subpacket transmission (not decoded correctly) and NAK are transmitted the same as the first eight frames described above with respect to FIG. 10. In this example, the second subpacket transmission is also received and decoded correctly. However, instead of an ACK_RC being sent by the base station, an ACK_STOP is transmitted. If no grant accompanied the ACK_STOP, the mobile station would revert to autonomous transmission. Instead, a new grant is transmitted. The mobile station needn't monitor the F-RCCH for this frame. The mobile station then transmits the first subpacket of the next packet in accordance with the new grant.

FIG. 12 depicts timing for an example embodiment with combined acknowledgement and rate control channels, without a grant. This example is identical to FIG. 10, except that no grant is sent in response to the original mobile station request. Thus, the first subpacket transmission of the first packet is transmitted at the autonomous rate. Again, this subpacket is decoded incorrectly at the base station. The second subpacket is again decoded correctly, and an ACK_RC is transmitted along with a rate control command. The mobile station then sends the next packet at the potentially adjusted rate. This example illustrates the possibility of moving a mobile station rate arbitrarily using rate control commands only, without any grant.

Note that in an alternative embodiment, a base station may use rate control with autonomous transmissions with or without a previous request. Reductions may be used to relieve congestion, and an increase may be awarded when there is extra capacity, even though the BS may not know the data requirements, since a request was not transmitted.

It should be noted that in all the embodiments described above, method steps can be interchanged without departing from the scope of the invention. The descriptions disclosed herein have in many cases referred to signals, parameters, and procedures associated with a 1xEV-DV system, but the scope of the present invention is not limited as such. Those of skill in the art will readily apply the principles herein to various other communication systems. These and other modifications will be apparent to those of ordinary skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
 a message generator configured to:
  generate a first message comprising an acknowledgment indicator and a rate control indicator, wherein the rate control indicator indicates at least whether a rate control command will be generated and issued; and
  generate a second message conditioned on the rate control indicator indicating at least that the rate control command will be generated and issued.

2. The apparatus of claim 1, wherein the second message comprises the rate control command.

3. The apparatus of claim 2, wherein the rate control command is one of a plurality of values, wherein one or more of the plurality of values indicates a rate increase.

4. The apparatus of claim 2, wherein the rate control command is one of a plurality of values, wherein one or more of the plurality of values indicates a rate decrease.

5. The apparatus of claim 2, wherein the rate control command is one of a plurality of values, wherein one or more of the plurality of values indicates a rate hold.

6. An apparatus, comprising:
 a receiver configured to receive a packet;
 a decoder configured to decode the received packet; and
 a message generator configured to:

generate a first signal comprising one of a first plurality of values, each value associated with an acknowledgment (ACK) or negative acknowledgment (NAK), and one or more of the values indicating at least whether a rate control command is to be issued; and conditionally generate a second signal comprising one of a second plurality of values corresponding to a respective plurality of rate control commands, wherein the generation of the second signal is conditioned on the value of the first signal indicating at least that the rate control command is to be issued.

7. The apparatus of claim 6, further comprising a transmitter configured to transmit the first signal and conditionally transmit the second signal, wherein the transmission of the second signal is conditioned on the value in the first signal indicating at least that the rate control command is to be issued.

8. The apparatus of claim 6, wherein the receiver is further operable to receive one or more transmission requests and one or more autonomous transmissions, the apparatus further comprising a scheduler configured to allocate a shared resource in response to the one or more transmission requests and the one or more autonomous transmissions.

9. The apparatus of claim 8, wherein the message generator further configured to generate a grant message in response to a transmission request in accordance with the allocation.

10. An apparatus, comprising:
a receiver configured to receive a first signal comprising a rate control indicator and conditionally receive a second signal in accordance with the rate control indicator when the rate control indicator indicates that a rate control command will be issued; and
a message decoder configured to decode the rate control indicator from the received first signal.

11. The apparatus of claim 10, wherein the first signal comprises an acknowledgement.

12. The apparatus of claim 10, wherein the second signal comprises the rate control command.

13. The apparatus of claim 12, wherein the rate control command is one of a plurality of values, wherein one or more of the plurality of values indicates a rate increase.

14. The apparatus of claim 12, wherein the rate control command is one of a plurality of values, wherein one or more of the plurality of values indicates a rate decrease.

15. The apparatus of claim 12, wherein the rate control command is one of a plurality of values, wherein one or more of the plurality of values indicates a rate hold.

16. The apparatus of claim 10, further comprising a transmitter configured to transmit a packet.

17. The apparatus of claim 16, wherein the transmitter retransmits the packet when the first signal indicates the transmitted packet is not acknowledged.

18. The apparatus of claim 16, wherein the second signal comprises a rate control command, and the transmitter transmits a second packet at a rate determined in accordance with the rate control command.

19. A base station, comprising:
a message generator configured to:
generate a first message comprising an acknowledgment indicator and a rate control indicator, wherein the rate control indicator indicates at least whether a rate control command will be transmitted; and
conditionally generate a second message, wherein the generation of the second message is conditioned on the rate control indicator indicating that the rate control command will be transmitted.

20. A remote station, comprising:
a receiver configured to receive a first signal comprising a rate control indicator and conditionally receive a second signal in accordance with the rate control indicator, wherein the reception of the second signal is conditioned on the rate control indicator indicating that a rate control command will be transmitted to the remote station; and
a message decoder configured to decode the rate control indicator from the received first signal.

21. A wireless communication system, including a base station, comprising:
a message generator configured to:
generate a first message comprising an acknowledgment indicator and a rate control indicator, wherein the rate control indicator indicates at least whether a rate control command will be generated; and
conditionally generate a second message, wherein the generation of the second message is conditioned on the rate control indicator indicating that the rate control command will be generated.

22. A wireless communication system, including a remote station, comprising:
a receiver configured to receive a first signal comprising a rate control indicator and conditionally receive a second signal in accordance with the rate control indicator, wherein the reception of the second signal is conditioned on the rate control indicator indicating that a rate control command will be issued; and
a message decoder configured to decode the rate control indicator from the received first signal.

23. A method for rate control, comprising:
employing at least one processor executing computer executable instructions stored on a computer readable storage medium to implement the following acts:
generating a first signal comprising one of a first plurality of values, each value associated with an acknowledgment (ACK) or negative acknowledgment (NAK), and one or more of the values indicating at least whether a rate control command will be generated and issued; and
conditionally generating a second signal comprising one of a second plurality of values corresponding to a respective plurality of rate control commands, the generating the second signal conditioned on the value of the first signal indicating the rate control command will be generated and issued.

24. A method for rate control, comprising:
employing at least one processor executing computer executable instructions stored on a computer readable storage medium to implement the following acts:
receiving a first signal comprising one of a first plurality of values, each value associated with an acknowledgment (ACK) or negative acknowledgment (NAK), and one or more of the values indicating at least whether a rate control command is to be issued; and
conditionally receiving a second signal comprising one of a plurality of rate control commands, wherein the receiving the second signal is conditioned on the value of the first received signal indicating the rate control command is to be issued.

25. A method for rate control, comprising:
employing at least one processor executing computer executable instructions stored on a computer readable storage medium to implement the following acts:
transmitting a packet;
receiving a first signal indicating whether the transmitted packet was acknowledged and whether a rate control command will be issued; and receiving a second signal comprising the rate control command when the rate control command is issued, wherein the receiving the second signal is conditioned on the first signal indicating the rate control command will be issued.

26. The method of claim 25, wherein the first signal comprises one of a first plurality of values, one of the first plurality of values indicating an acknowledgment of correct decoding and no rate control command.

27. The method of claim 26, wherein the value indicating an acknowledgment of correct decoding and no rate control command revokes a prior grant.

28. The method of claim 25, wherein the first signal comprises one of a first plurality of values, one of the first plurality of values indicating an acknowledgment of correct decoding and a rate control command.

29. The method of claim 25, wherein the first signal comprises a value indicating no transmission corresponding to a negative acknowledgment of the decoded packet and no rate control command.

30. The method of claim 25, wherein the rate control command is one of a second plurality of values, wherein one or more of the second plurality of values indicates a rate increase.

31. The method of claim 25, wherein the rate control command is one of a second plurality of values, wherein one or more of the second plurality of values indicates a rate decrease.

32. The method of claim 25, wherein the rate control command is one of a second plurality of values, wherein one of the second plurality of values indicates a rate hold.

33. The method of claim 32, wherein the second signal comprises a value indicating no transmission for a rate hold.

34. The method of claim 25, further comprising:
retransmitting the packet when the first received signal indicates the transmitted packet was not acknowledged.

35. The method of claim 25, further comprising:
transmitting a second packet when the first received signal indicates the transmitted packet was acknowledged.

36. The method of claim 25, wherein the second packet is transmitted at a rate determined in accordance with the rate control command when a rate control command is received on the second signal.

37. The method of claim 25, wherein the transmitted packet is a subpacket.

38. An apparatus, comprising:
means for generating a first signal comprising one of a first plurality of values, each value associated with an acknowledgment (ACK) or negative acknowledgment (NAK), and one or more values indicating at least whether a rate control command will be issued; and
means for conditionally generating a second signal comprising one of a second plurality of values corresponding to a respective plurality of rate control commands when the value of the first signal indicates the rate control command will be issued.

39. An apparatus for rate control, comprising:
means for receiving a packet;
means for decoding the packet;
means for generating a first signal indicating whether the received packet was decoded correctly and indicating whether a rate control command will be issued; and
means for generating a second signal comprising the rate control command when the first signal indicates the rate control command will be issued.

40. An apparatus for rate control, comprising:
means for transmitting a first signal comprising one of a first plurality of values, each value associated with an acknowledgment (ACK) or negative acknowledgment (NAK), and one or more of the values indicating whether a rate control command will be transmitted; and
means for transmitting a second signal comprising the rate control command, wherein the transmitting the second signal is conditioned on the first signal indicating the rate control command will be transmitted.

41. An apparatus for rate control, comprising:
means for transmitting a packet;
means for receiving a first signal indicating whether the transmitted packet was acknowledged and whether a rate control command will be issued; and
means for receiving a second signal comprising the rate control command when the first signal indicates the rate control command will be issued.

42. A wireless communication system, comprising:
means for generating a first signal comprising one of a first plurality of values, each value associated with an acknowledgment (ACK) or negative acknowledgment (NAK), and one or more of the values indicating at least whether a rate control command is to be issued; and
means for conditionally generating a second signal comprising one of a second plurality of values corresponding to a respective plurality of rate control commands when the value of the first signal indicates the rate control command is to be issued.

43. A wireless communication system, comprising:
means for receiving a first signal comprising one of a first plurality of values, each value associated with an acknowledgment (ACK) or negative acknowledgment (NAK), and one or more of the values indicating at least whether a rate control command is to be issued; and
means for conditionally receiving a second signal comprising one of a second plurality of values corresponding to a respective plurality of rate control commands when the value of the first received signal indicates the rate control command is to be issued.

44. Computer readable media containing a set of instructions which when executed perform the following acts:
generating a first signal comprising one of a first plurality of values, each value associated with an acknowledgment (ACK) or negative acknowledgment (NAK), and one or more of the values indicating at least whether a rate control command will be generated and transmitted; and
conditionally generating a second signal comprising one of a second plurality of values corresponding to a respective plurality of rate control commands, wherein the generating the second signal is conditioned on the value of the first signal indicates a indicating the rate control command will be generated and transmitted.

45. Computer readable media containing a set of instructions which when executed perform the following acts:
receiving a packet;
decoding the packet;
generating a first signal indicating whether the received packet was decoded correctly and indicating whether a rate control command will be issued; and
generating a second signal comprising the rate control command when the first signal indicates the rate control command will be issued.

46. Computer readable media containing a set of instructions which when executed perform the following acts:
- receiving a first signal comprising one of a first plurality of values, each value associated with an acknowledgment (ACK) or negative acknowledgment (NAK), and one or more of the values indicating at least whether a rate control command is to be received; and
- conditionally receiving a second signal comprising one of a second plurality of values corresponding to a respective plurality of rate control commands, wherein the receiving the second signal is conditioned on the value of the first received signal indicating the rate control command is to be received.

47. Computer readable media containing a set of instructions which when executed perform the following acts:
- transmitting a packet;
- receiving a first signal indicating whether the transmitted packet was acknowledged and whether a rate control command will be issued; and
- receiving a second signal comprising the rate control command, wherein the receiving the second signal is conditioned on the first signal indicating the rate control command will be issued.

48. A method for rate control, comprising:
- employing at least one processor executing computer executable instructions stored on a computer readable storage medium to implement the following acts:
- receiving a packet;
- decoding the packet;
- generating a first signal indicating whether the received packet was decoded correctly and indicating whether a rate control command will be issued; and
- generating a second signal comprising the rate control command, wherein the generating the second signal is conditioned on the first signal indicating the rate control command will be issued.

49. The method of claim 48, wherein the first signal comprises one of a first plurality of values, one of the first plurality of values indicating an acknowledgment of correct decoding and no rate control command.

50. The method of claim 49, wherein the value indicating an acknowledgment of correct decoding and no rate control command revokes a prior grant.

51. The method of claim 48, wherein the first signal comprises one of a first plurality of values, one of the first plurality of values indicating an acknowledgment of correct decoding and a rate control command.

52. The method of claim 48, wherein the first signal comprises a value indicating no transmission corresponding to a negative acknowledgment of the decoded packet and no rate control command.

53. The method of claim 48, wherein the rate control command is one of a second plurality of values, wherein one or more of the second plurality of values indicates a rate increase.

54. The method of claim 48, wherein the rate control command is one of a second plurality of values, wherein one or more of the second plurality of values indicates a rate decrease.

55. The method of claim 48, wherein the rate control command is one of a second plurality of values, wherein one of the second plurality of values indicates a rate hold.

56. The method of claim 55, wherein the second signal comprises a value indicating no transmission for a rate hold.

57. The method of claim 48, further comprising:
- receiving one or more autonomous transmissions; and
- allocating a shared resource in response to the one or more transmission requests and the one or more autonomous transmissions.

58. The method of claim 48, further comprising generating a grant in response to a received transmission request.

59. The method of claim 58, wherein the second signal is not generated when the grant is generated.

60. The method of claim 48, further comprising transmitting the first signal; and conditionally transmitting the second signal when a rate control command is issued.

61. The method of claim 60, further comprising transmitting the grant when a grant is issued.

62. The method of claim 48, wherein the received packet is a subpacket.

63. The method of claim 62 wherein the decoding of the packet further comprising decoding the packet in response to previously received corresponding subpackets, if any.

* * * * *